US012802886B2

(12) United States Patent
Nakaoku

(10) Patent No.: US 12,802,886 B2
(45) Date of Patent: Nov. 17, 2026

(54) MULTILAYER CERAMIC ELECTRONIC COMPONENT

(71) Applicant: Murata Manufacturing Co., Ltd., Nagaokakyo (JP)

(72) Inventor: Tadaharu Nakaoku, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 147 days.

(21) Appl. No.: 18/979,769

(22) Filed: Dec. 13, 2024

(65) Prior Publication Data

US 2025/0308794 A1 Oct. 2, 2025

(30) Foreign Application Priority Data

Mar. 27, 2024 (JP) ................................ 2024-051009

(51) Int. Cl.

| | |
|---|---|
| ***H01G 4/30*** | (2006.01) |
| ***H01G 4/008*** | (2006.01) |
| ***H01G 4/12*** | (2006.01) |
| ***H01G 4/232*** | (2006.01) |
| ***H01G 4/248*** | (2006.01) |

(52) U.S. Cl.

CPC ........... *H01G 4/2325* (2013.01); *H01G 4/008* (2013.01); *H01G 4/1227* (2013.01); *H01G 4/1236* (2013.01); *H01G 4/248* (2013.01); *H01G 4/30* (2013.01)

(58) Field of Classification Search

None

See application file for complete search history.

(56) References Cited

U.S. PATENT DOCUMENTS

| | | | | |
|---|---|---|---|---|
| 10,395,827 | B2 * | 8/2019 | Ito | H01G 4/1227 |
| 10,497,516 | B2 * | 12/2019 | Ito | H01G 4/30 |
| 12,505,955 | B2 * | 12/2025 | Watanabe | H01G 4/232 |
| 2010/0276190 | A1 * | 11/2010 | Matsushita | H05K 3/38 29/832 |
| 2013/0120898 | A1 * | 5/2013 | Park | H01G 4/30 252/514 |
| 2018/0082792 | A1 * | 3/2018 | Satoh | H01G 4/232 |

(Continued)

FOREIGN PATENT DOCUMENTS

| | | |
|---|---|---|
| JP | 2003243249 A | 8/2003 |
| JP | 2012182355 A | 9/2012 |

(Continued)

*Primary Examiner* — Dion R. Ferguson

(74) *Attorney, Agent, or Firm* — Keating & Bennett, LLP

(57) ABSTRACT

A multilayer ceramic electronic component includes a multilayer body and external electrodes at both ends of the multilayer body. The external electrodes include a main surface-side external electrode including a main surface-side base electrode layer and a main surface-side plated layer above the main surface-side base electrode layer. The main surface-side external electrode includes a recess recessed towards the multilayer body side in a cross-sectional view along a lamination direction and a length direction of the multilayer body. The main surface-side base electrode layer includes a recess-corresponding region corresponding to the recess, and peripheral regions adjacent to the recess-corresponding region in the length direction. A metal density in the recess-corresponding region is lower than a metal density in the peripheral regions.

18 Claims, 12 Drawing Sheets

(56) References Cited

U.S. PATENT DOCUMENTS

| | | | | |
|---|---|---|---|---|
| 2018/0090271 | A1* | 3/2018 | Ito | H01G 4/1209 |
| 2018/0090274 | A1* | 3/2018 | Ito | H01G 4/1227 |
| 2019/0157004 | A1 | 5/2019 | Park et al. | |
| 2020/0029438 | A1 | 1/2020 | Sasaki | |
| 2021/0280374 | A1* | 9/2021 | Nishikawa | H01G 13/00 |
| 2023/0083171 | A1* | 3/2023 | Kishi | H01G 4/232<br>361/301.4 |
| 2025/0279240 | A1* | 9/2025 | Watanabe | H01G 4/232 |
| 2025/0279242 | A1* | 9/2025 | Nishino | H01G 2/065 |
| 2025/0279243 | A1* | 9/2025 | Itamochi | H01G 4/30 |
| 2025/0299884 | A1* | 9/2025 | Itogawa | H01G 4/232 |
| 2025/0308794 | A1* | 10/2025 | Nakaoku | H01G 4/008 |

FOREIGN PATENT DOCUMENTS

| | | | | | |
|---|---|---|---|---|---|
| JP | 2018046229 | A | | 3/2018 | |
| JP | 2020017557 | A | | 1/2020 | |
| JP | 2021082685 | A | * | 5/2021 | H01G 4/012 |
| KR | 20140067477 | A | * | 6/2014 | H01G 4/2325 |
| KR | 20190059008 | A | | 5/2019 | |

* cited by examiner

MULTILAYER CERAMIC ELECTRONIC COMPONENT

CROSS REFERENCE TO RELATED APPLICATIONS

This application claims the benefit of priority to Japanese Patent Application No. 2024-051009 filed on Mar. 27, 2024. The entire contents of this application are hereby incorporated herein by reference.

BACKGROUND OF THE INVENTION

1. Field of the Invention

The present invention relates to multilayer ceramic electronic components.

2. Description of the Related Art

Conventionally, multilayer ceramic capacitors as multilayer ceramic electronic components are known. In general, a multilayer ceramic capacitor includes a multilayer body, in which dielectric layers and internal electrode layers are alternately stacked, and external electrodes are provided on both end surfaces of the multilayer body. For example, Japanese Unexamined Patent Application, Publication No. 2003-243249 discloses a multilayer ceramic capacitor with the aforementioned structure, in which the external electrodes include a base electrode layer formed by firing.

In this type of multilayer ceramic capacitor, when mounted on a board, the bending stress occurring in the external electrodes is transmitted to the multilayer body, leading to concern that cracks or the like may occur in the multilayer body. Therefore, there is a demand for a multilayer ceramic capacitor with improved flexural resistance.

SUMMARY OF THE INVENTION

Example embodiments of the present invention provide multilayer ceramic electronic components each with improved flexural resistance.

A multilayer ceramic electronic component according to an example embodiment of the present invention includes a multilayer body and a pair of external electrodes. The multilayer body includes a plurality of ceramic layers and a plurality of inner conductive layers stacked alternately in a lamination direction, first and second main surfaces on opposite sides in the lamination direction, first and second end surfaces on opposite sides in a length direction orthogonal or substantially orthogonal to the lamination direction, and first and second lateral surfaces on opposite sides in a width direction orthogonal or substantially orthogonal to both the lamination direction and the length direction. The pair of external electrodes are spaced apart from each other at both ends of the multilayer body in the length direction. The inner conductive layers include a first inner conductive layer extending to the first end surface, and a second inner conductive layer extending to the second end surface. The external electrodes include a main surface-side external electrode on at least one of the first or second main surfaces. The main surface-side external electrode includes a main surface-side base electrode layer, and a main surface-side plated layer above the main surface-side base electrode layer. The main surface-side external electrode includes a recess recessed towards the multilayer body side in a cross-sectional view along the lamination direction and the length direction. The main surface-side base electrode layer includes a recess-corresponding region corresponding to the recess, and peripheral regions adjacent to the recess-corresponding region in the length direction. The metal density in the recess-corresponding region is lower than the metal density in the peripheral regions.

Example embodiments of the present invention provide multilayer ceramic electronic components each with improved flexural resistance.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Example embodiments of the present invention will be described in detail below with reference to the drawings.

Figure 1:
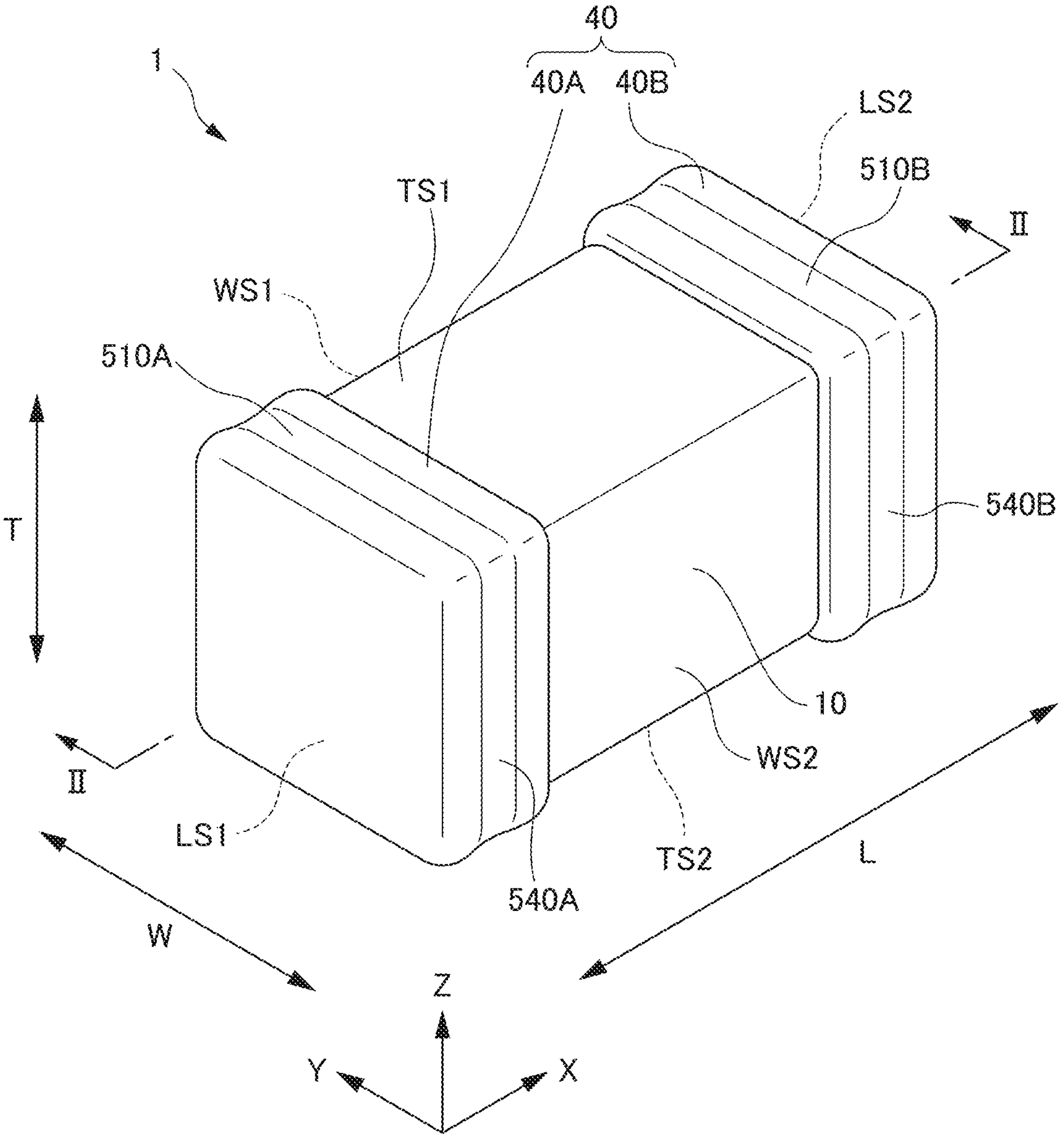
FIG. 1 is a perspective view of a multilayer ceramic capacitor according to an example embodiment of the present invention.
Figure 2:
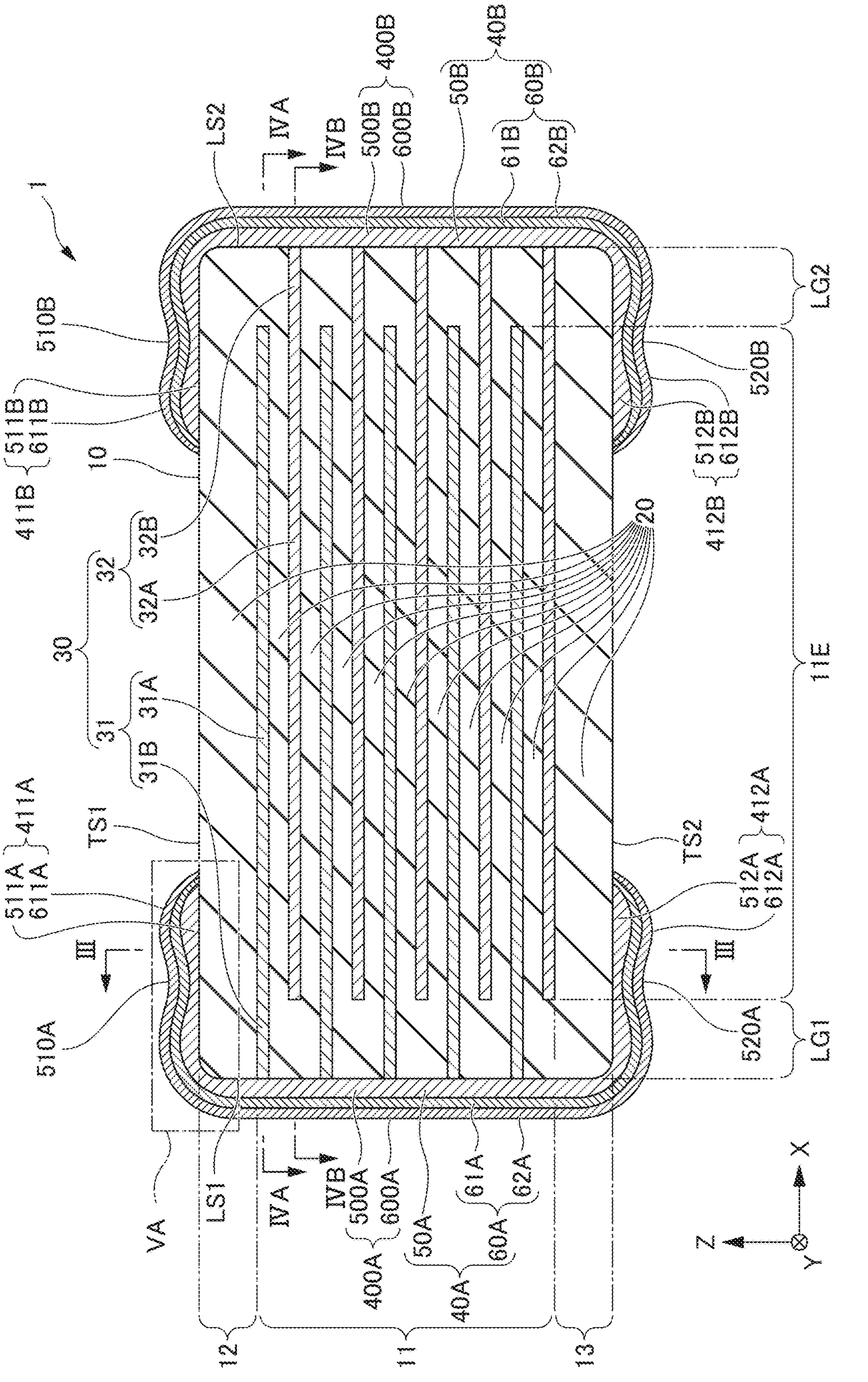
FIG. 2 is a cross-sectional view taken along the line II-II of FIG. 1.
Figure 3:
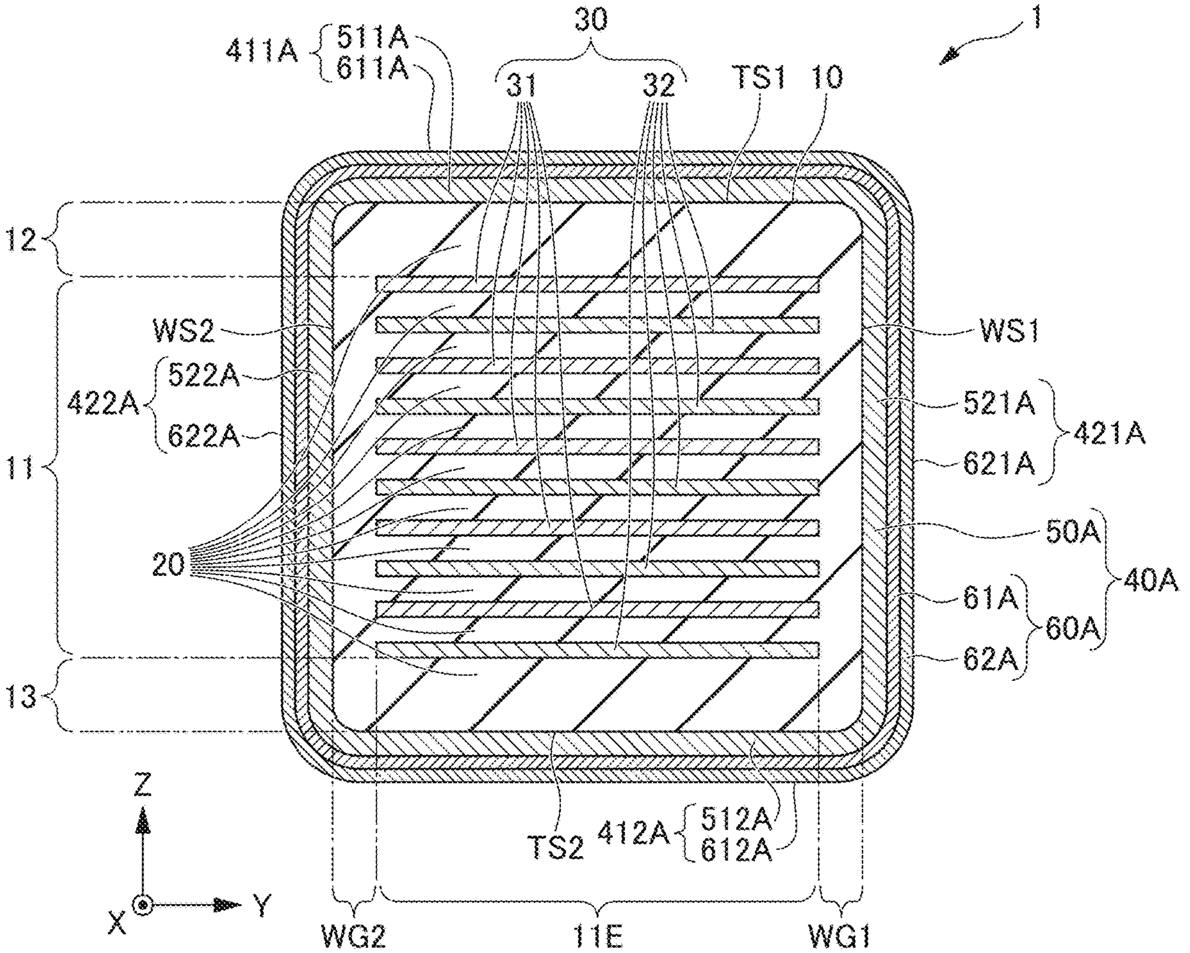
FIG. 3 is a cross-sectional view taken along the line III-III of FIG. 2.
Figure 4A:
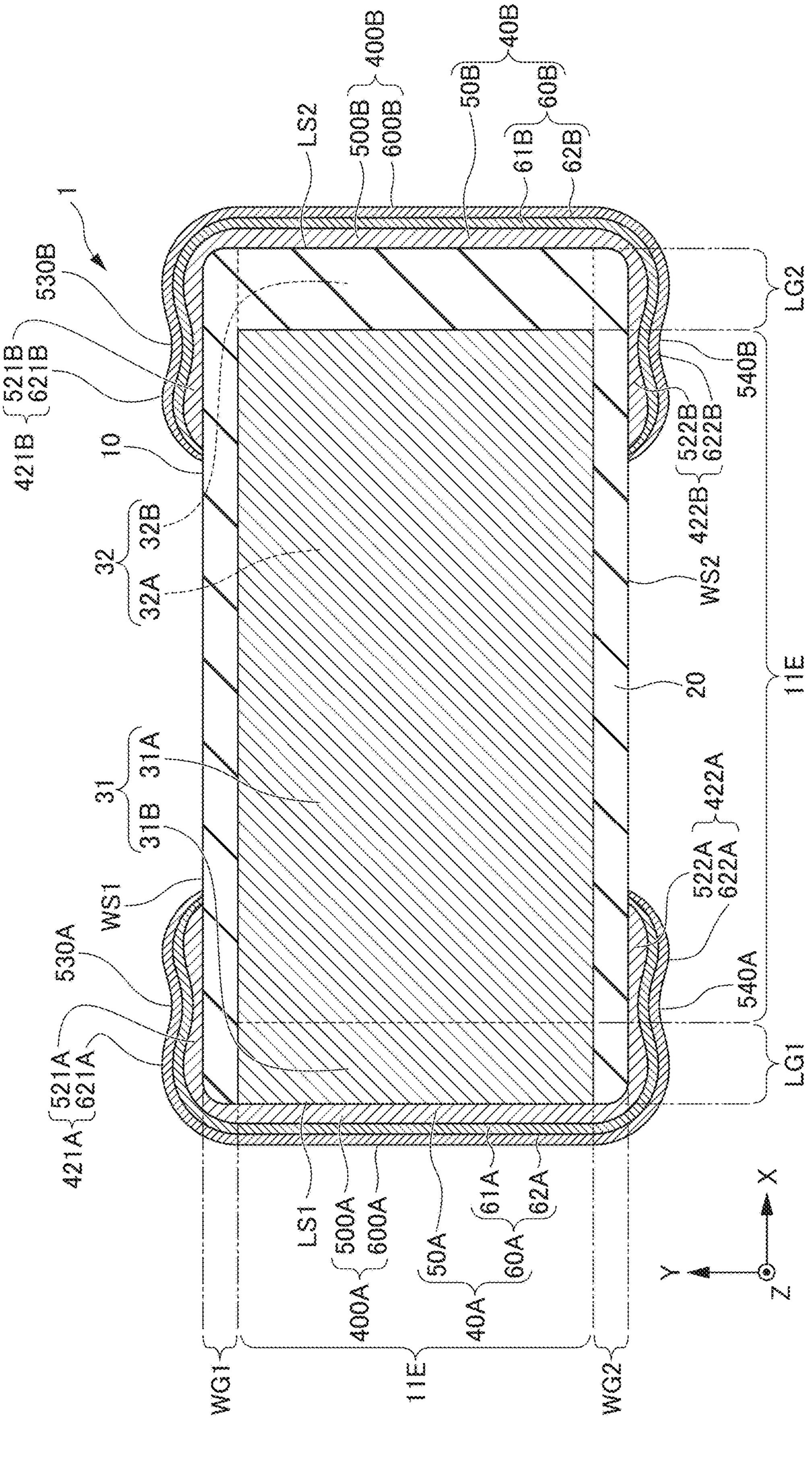
FIG. 4A is a cross-sectional view taken along the line IVA-IVA of FIG. 2.
Figure 4B:
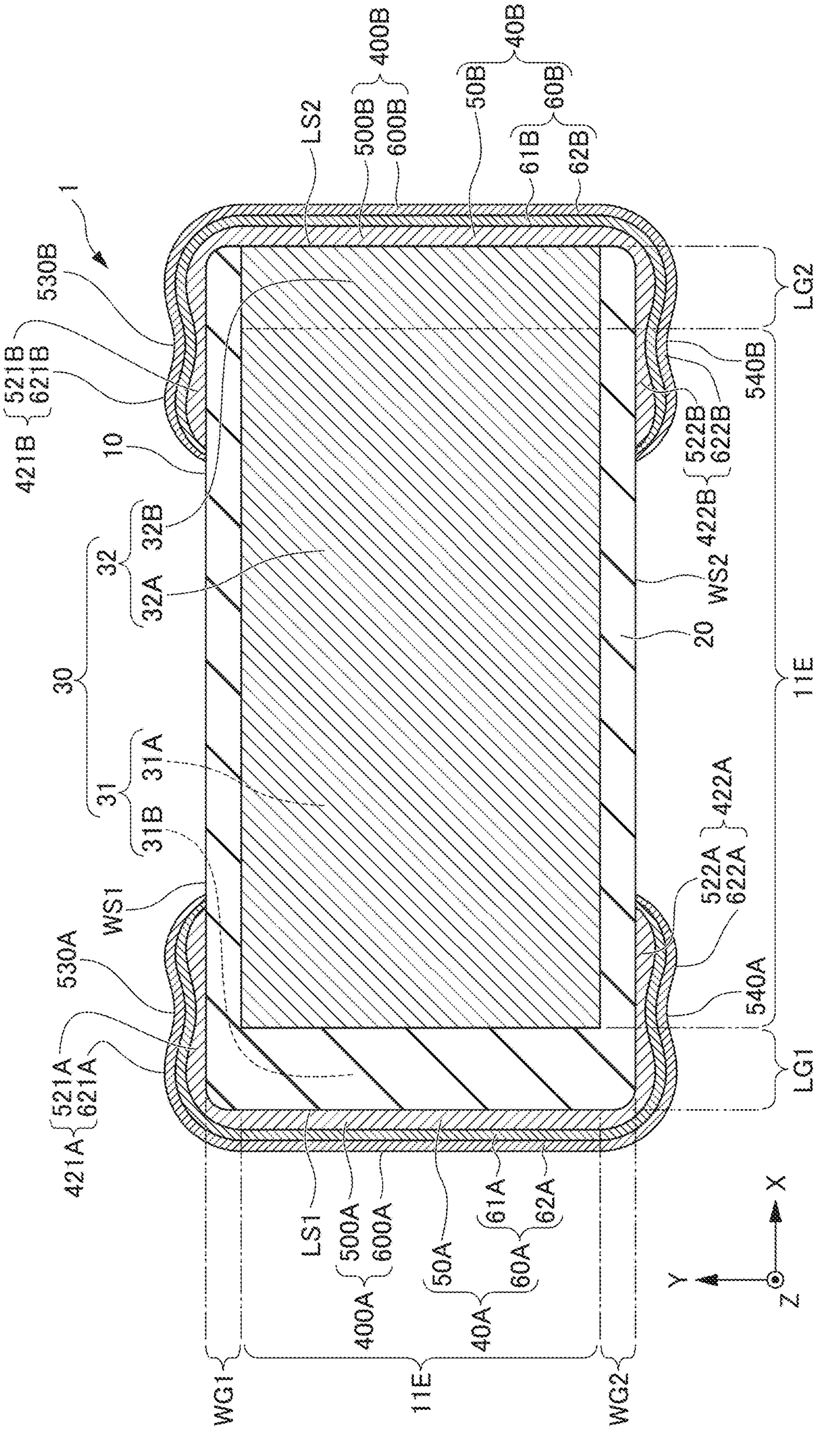
FIG. 4B is a cross-sectional view taken along the line IVB-IVB of FIG. 2.

A multilayer ceramic capacitor 1 as a multilayer ceramic electronic component according to an example embodiment of the present invention will be described with reference to the drawings. FIG. 1 is a perspective view of the multilayer ceramic capacitor 1 according to an example embodiment. FIG. 2 is a cross-sectional view taken along the line II-II of FIG. 1. FIG. 3 is a cross-sectional view taken along the line III-III of FIG. 2. FIG. 4A is a cross-sectional view taken along the line IVA-IVA of FIG. 2. FIG. 4B is a cross-sectional view taken along the line IVB-IVB of FIG. 2.

As illustrated in FIG. 1, the multilayer ceramic capacitor 1 according to an example embodiment has a rectangular or substantially rectangular parallelepiped shape. The multilayer ceramic capacitor 1 includes a multilayer body 10 having a rectangular or substantially rectangular parallelepiped shape, and a pair of external electrodes 40 spaced apart from each other at both ends of the multilayer body 10.

In FIG. 1, the arrow T indicates the lamination direction of the multilayer ceramic capacitor 1 and the multilayer body 10. The lamination direction T is also the thickness direction and the height direction of the multilayer ceramic capacitor 1 and the multilayer body 10. In FIG. 1, the arrow L indicates the length direction orthogonal or substantially orthogonal to the lamination direction T of the multilayer ceramic capacitor 1 and the multilayer body 10. In FIG. 1, the arrow W indicates the width direction orthogonal or substantially orthogonal to both the lamination direction T and the length direction L of the multilayer ceramic capacitor 1 and the multilayer body 10. The pair of external electrodes 40 are provided at one end and the other end of the multilayer body 10 in the length direction L, respectively.

FIGS. 1 to 4B illustrate an XYZ orthogonal coordinate system. The length direction L of the multilayer ceramic capacitor 1 and the multilayer body 10 corresponds to the X direction. The width direction W of the multilayer ceramic capacitor 1 and the multilayer body 10 corresponds to the Y direction. The lamination direction T of the multilayer ceramic capacitor 1 and the multilayer body 10 corresponds to the Z direction. The cross section illustrated in FIG. 2 is also referred to as an LT cross section. The cross section illustrated in FIG. 3 is also referred to as a WT cross section. The cross section illustrated in FIGS. 4A and 4B is also referred to as an LW cross section.

As illustrated in FIGS. 1 to 4B, the multilayer body 10 includes a first main surface TS1 and a second main surface TS2 on opposite sides in the lamination direction T, a first end surface LS1 and a second end surface LS2 on opposite sides in the length direction L orthogonal or substantially orthogonal to the lamination direction T, and a first lateral surface WS1 and a second lateral surface WS2 on opposite sides in the width direction W orthogonal or substantially orthogonal to both the lamination direction T and the length direction L.

As illustrated in FIG. 1, the multilayer body 10 has a rectangular or substantially rectangular parallelepiped shape. The dimension in the length direction L of the multilayer body 10 is not necessarily longer than the dimension in the width direction W. The corners and edges of the multilayer body 10 are preferably rounded. The corners are where three faces of the multilayer body intersect, and the edges are where two faces of the multilayer body intersect. The surfaces of the multilayer body 10 may include irregularities in all or a portion thereof.

The dimensions of the multilayer body 10 are not particularly limited. However, the dimension of the multilayer body 10 in the length direction L, denoted as the L dimension, is, for example, preferably between about 0.2 mm and about 10 mm inclusive. The dimension of the multilayer body 10 in the lamination direction T, denoted as the T dimension, is, for example, preferably between about 0.05 mm and about 10 mm inclusive. The dimension of the multilayer body 10 in the width direction W, denoted as the W dimension, is, for example, preferably between about 0.1 mm and about 10 mm inclusive.

As illustrated in FIGS. 2 and 3, the multilayer body 10 includes an inner layer portion 11, and a first main surface-side outer layer portion 12 as well as a second main surface-side outer layer portion 13 which sandwich the inner layer portion 11 in the lamination direction T.

The inner layer portion 11 includes a plurality of dielectric layers 20 as a plurality of ceramic layers, and a plurality of internal electrode layers 30 as a plurality of inner conductive layers, both of which are stacked alternately in the lamination direction T. The internal electrode layers 30 included in the inner layer portion 11 extend from an internal electrode layer 30 closest to the first main surface TS1 to another internal electrode layer 30 closest to the second main surface TS2, in the lamination direction T. In the inner layer portion 11, the plurality of internal electrode layers 30 face each other via the dielectric layers 20. The inner layer portion 11 defines and functions to generate capacitance, and essentially operates as a capacitor.

The dielectric layers 20 include dielectric materials. The dielectric materials may be, for example, dielectric ceramics containing components such as $BaTiO_3$, $CaTiO_3$, $SrTiO_3$, or $CaZrO_3$. In addition to these main components, the dielectric materials may include accessory components such as, for example, Mn compounds, Fe compounds, Cr compounds, Co compounds, or Ni compounds. The dielectric materials preferably include, for example, $BaTiO_3$ as the main component.

The thickness of the dielectric layers 20 is, for example, preferably between about 0.2 μm and about 15 μm inclusive. The number of dielectric layers 20 to be stacked (laminated) is, for example, preferably between 10 and 1200 inclusive. The number of dielectric layers 20 is the total of the number of dielectric layers 20 in the inner layer portion 11, and the number of the dielectric layers 20 in the first main surface-side outer layer portion 12 and the second main surface-side outer layer portion 13.

The plurality of internal electrode layers 30 include a plurality of first internal electrode layers 31 as a plurality of first inner conductive layers, and a plurality of second internal electrode layers 32 as a plurality of second inner conductive layers. The first internal electrode layers 31 and the second internal electrode layers 32 are alternately provided in the lamination direction T with the dielectric layers 20 interposed therebetween. The first internal electrode layers 31 extend to the first end surface LS1. The second internal electrode layers 32 extend to the second end surface LS2. Hereinafter, when there is no need to distinguish between the first internal electrode layers 31 and the second internal electrode layers 32 for description, the first internal electrode layers 31 and the second internal electrode layers 32 may collectively be referred to as the internal electrode layers 30.

As illustrated in FIG. 4A, the first internal electrode layer 31 includes a first counter portion 31A and a first extension portion 31B. The first counter portion 31A is a region facing the second internal electrode layer 32 across the dielectric layer 20 and is provided inside the multilayer body 10. The first extension portion 31B is a portion extending from the first counter portion 31A to the first end surface LS1 and exposed at the first end surface LS1.

As illustrated in FIG. 4B, the second internal electrode layer 32 includes a second counter portion 32A and a second extension portion 32B. The second counter portion 32A is a region facing the first internal electrode layer 31 across the dielectric layer 20 and is provided inside the multilayer body 10. The second extension portion 32B is a portion extending from the second counter portion 32A to the second end surface LS2 and exposed at the second end surface LS2.

In the present example embodiment, the first counter portion 31A and the second counter portion 32A face each other across the dielectric layer 20, thus generating capacitance and providing the characteristics of the capacitor.

The shapes of the first counter portion 31A and the second counter portion 32A are not particularly limited but are preferably rectangular or substantially rectangular. However, the corners of the rectangular-shaped portions may be rounded or extending diagonally. The shapes of the first extension portion 31B and the second extension portion 32B are not particularly limited but are preferably rectangular or substantially rectangular. However, the corners of the rectangular-shaped portions may be rounded or extend diagonally.

Both of the dimensions of the first counter portion 31A and the first extension portion 31B in the width direction W may be the same or substantially the same, or one of the dimensions may be smaller. Both of the dimensions of the second counter portion 32A and the second extension portion 32B in the width direction W may be the same or substantially the same, or one of the dimensions may be smaller.

The first internal electrode layers 31 and the second internal electrode layers 32 are made of appropriate conductive materials such as, for example, Ni, Cu, Ag, Pd, Au, or alloys including at least one of these metals. When using an alloy, for example, the first internal electrode layers 31 and the second internal electrode layers 32 may be made of Ag—Pd alloy.

The thickness of the first internal electrode layers 31 and the second internal electrode layers 32 is, for example, preferably between about 0.2 μm and about 2.0 μm inclusive. The total number of the first internal electrode layers 31 and the second internal electrode layers 32 is, for example, preferably between 10 and 1000 inclusive.

As illustrated in FIGS. 2 and 3, the first main surface-side outer layer portion 12 is provided to the first main surface TS1 side of the multilayer body 10. The first main surface-side outer layer portion 12 is a collective portion including the plurality of dielectric layers 20 between the first main surface TS1 and the internal electrode layer 30 closest to the first main surface TS1. On the other hand, the second main surface-side outer layer portion 13 is provided to the second main surface TS2 side of the multilayer body 10. The second main surface-side outer layer portion 13 is a collective portion including the plurality of dielectric layers 20 between the second main surface TS2 and the internal electrode layer 30 closest to the second main surface TS2. The dielectric layers 20 used for the first main surface-side outer layer portion 12 and the second main surface-side outer layer portion 13 may be the same or substantially the same as the dielectric layers 20 used for the inner layer portion 11.

The multilayer body 10 includes a counter electrode portion 11E. The counter electrode portion 11E is a portion where the first counter portion 31A of the first internal electrode layer 31 faces the second counter portion 32A of the second internal electrode layer 32. The counter electrode portion 11E is a portion of the inner layer portion 11. FIGS. 4A and 4B illustrate the range of the counter electrode portion 11E in the width direction W and the length direction L. The counter electrode portion 11E is also referred to as the capacitor active portion.

The multilayer body 10 includes lateral surface-side outer layer portions. The lateral surface-side outer layer portions include a first lateral surface-side outer layer portion WG1 and a second lateral surface-side outer layer portion WG2. The first lateral surface-side outer layer portion WG1 is a portion including the dielectric layers 20 between the counter electrode portion 11E and the first lateral surface WS1. The second lateral surface-side outer layer portion WG2 is a portion including the dielectric layers 20 between the counter electrode portion 11E and the second lateral surface WS2. FIGS. 3, 4A, and 4B illustrate the range of the first lateral surface-side outer layer portion WG1 and the second lateral surface-side outer layer portion WG2 in the width direction W. The lateral surface-side outer layer portions are also referred to as a W-gap or side gap.

The multilayer body 10 includes end surface-side outer layer portions. The end surface-side outer layer portions include a first end surface-side outer layer portion LG1 and a second end surface-side outer layer portion LG2. The first end surface-side outer layer portion LG1 is a portion including the dielectric layers 20 and the first extension portion 31B between the counter electrode portion 11E and the first end surface LS1. In other words, the first end surface-side outer layer portion LG1 is a collective portion including a portion of the plurality of dielectric layers 20 on the first end surface LS1 side and the plurality of first extension portions 31B. Similarly, the second end surface-side outer layer portion LG2 is a portion including the dielectric layers 20 and the second extension portion 32B between the counter electrode portion 11E and the second end surface LS2. In other words, the second end surface-side outer layer portion LG2 is a collective portion including a portion of the plurality of dielectric layers 20 on the second end surface LS2 side and the plurality of second extension portions 32B. FIGS. 2, 4A, and 4B illustrate the range of the first end surface-side outer layer portion LG1 and the second end surface-side outer layer portion LG2 in the length direction L. The end surface-side outer layer portions are also referred to as an L-gap or end gap.

As illustrated in FIGS. 1 and 2, the external electrodes 40 include a first external electrode 40A provided on the first end surface LS1 side of the multilayer body 10, and a second external electrode 40B provided on the second end surface LS2 side of the multilayer body 10.

The basic structure of the first external electrode 40A and the second external electrode 40B is the same or substantially the same. The shape of the first external electrode 40A and the second external electrode 40B is substantially plane-symmetrical with respect to the WT cross section at the center in the length direction L of the multilayer ceramic capacitor 1. Therefore, when there is no need to distinguish between the first external electrode 40A and the second external electrode 40B for description, the first external electrode 40A and the second external electrode 40B may be collectively referred to as the external electrodes 40.

The first external electrode 40A is provided on the first end surface LS1. The first external electrode 40A is in contact with the first extension portions 31B of the plurality of first internal electrode layers 31 exposed at the first end surface LS1. Consequently, the first external electrode 40A is electrically connected to the plurality of first internal electrode layers 31. The first external electrode 40A may also be provided on a portion of the first main surface TS1, a portion of the second main surface TS2, a portion of the first lateral surface WS1, and a portion of the second lateral surface WS2. In the present example embodiment, the first external electrode 40A extends from the first end surface LS1 to a portion of the first main surface TS1, a portion of the second main surface TS2, a portion of the first lateral surface WS1, and a portion of the second lateral surface WS2.

The second external electrode 40B is provided on the second end surface LS2. The second external electrode 40B is in contact with each of the second extension portions 32B of the plurality of second internal electrode layers 32 exposed at the second end surface LS2. Consequently, the second external electrode 40B is electrically connected to the plurality of second internal electrode layers 32. The second external electrode 40B may be provided on a portion of the first main surface TS1, a portion of the second main surface TS2, a portion of the first lateral surface WS1, and a portion of the second lateral surface WS2. In the present example embodiment, the second external electrode 40B extends from the second end surface LS2 to a portion of the first main surface TS1, a portion of the second main surface TS2, a portion of the first lateral surface WS1, and a portion of the second lateral surface WS2.

As described above, within the multilayer body 10, the first counter portion 31A of the first internal electrode layer 31 faces the second counter portion 32A of the second internal electrode layer 32 via the dielectric layer 20, thus generating capacitance. Therefore, capacitor characteristics are provided between the first external electrode 40A connected to the first internal electrode layer 31 and the second external electrode 40B connected to the second internal electrode layer 32.

As illustrated in FIGS. 2, 4A, and 4B, the first external electrode 40A includes a first base electrode layer 50A and a first plated layer 60A provided on the first base electrode layer 50A. The second external electrode 40B includes a second base electrode layer 50B and a second plated layer 60B provided on the second base electrode layer 50B.

The first base electrode layer 50A is provided on the first end surface LS1. The first base electrode layer 50A is connected to the first extension portions 31B of the plurality of first internal electrode layers 31 exposed at the first end surface LS1. In the present example embodiment, the first base electrode layer 50A extends from the first end surface LS1 to a portion of the first main surface TS1, a portion of the second main surface TS2, a portion of the first lateral surface WS1, and a portion of the second lateral surface WS2.

The second base electrode layer 50B is provided on the second end surface LS2. The second base electrode layer 50B is in contact with the second extension portions 32B of the plurality of second internal electrode layers 32 exposed at the second end surface LS2. In the present example embodiment, the second base electrode layer 50B extends from the second end surface LS2 to a portion of the first main surface TS1, a portion of the second main surface TS2, a portion of the first lateral surface WS1, and a portion of the second lateral surface WS2.

The first base electrode layer 50A and the second base electrode layer 50B of the present example embodiment are fired layers. The fired layer preferably includes a metal component and either a glass component or a ceramic component, or both. The metal component may include, for example, at least one of Cu, Ni, Ag, Pd, Ag—Pd alloy, or Au. The glass component may include, for example, at least one of B, Si, Ba, Mg, Al, or Li. The ceramic component may use the same ceramic material as the dielectric layer 20 or a different type of ceramic material. Examples of the ceramic component include at least one of $BaTiO_3$, $CaTiO_3$, $(Ba, Ca)TiO_3$, $SrTiO_3$, or $CaZrO_3$.

The fired layer is formed by applying a conductive paste including glass and metal to the multilayer body 10 followed by firing. The fired layer can be formed by simultaneously firing a pre-firing multilayer chip, which is a material of the multilayer body 10 including a plurality of internal electrodes and dielectric layers, and the conductive paste applied to the multilayer chip. Alternatively, the fired layer can be formed by obtaining the multilayer body 10 by firing the multilayer chip and then applying the conductive paste to the multilayer body 10 followed by firing. In the case as described above, the fired layer is preferably formed by firing a mixture containing ceramic material instead of a glass component. In this case, as the ceramic material to be added, using a ceramic material similar to the dielectric layer 20 is particularly preferable. The fired layer may be a plurality of layers.

The thickness of the first base electrode layer 50A provided on the first end surface LS1 in the length direction L is, for example, preferably approximately between about 2 μm and about 220 μm inclusive at the center of the first base electrode layer 50A in the lamination direction T and the width direction W.

The thickness of the second base electrode layer 50B provided on the second end surface LS2 in the length direction L is, for example, preferably between about 2 μm and about 220 μm inclusive at the center of the second base electrode layer 50B in the lamination direction T and the width direction W.

In cases where the first base electrode layer 50A is also provided on a portion of at least one of the first main surface TS1 or the second main surface TS2, the thickness of the first base electrode layer 50A provided in this portion in the lamination direction T is, for example, preferably between about 3 μm and about 40 μm inclusive at the center of the first base electrode layer 50A provided in this portion in the length direction L and the width direction W.

In cases where the first base electrode layer 50A is also provided on a portion of at least one of the first lateral surface WS1 or the second lateral surface WS2, the thickness of the first base electrode layer 50A provided in this portion in the width direction W is, for example, preferably between about 3 μm and about 40 μm inclusive at the center of the first base electrode layer 50A provided in this portion in the length direction L and the lamination direction T.

In cases where the second base electrode layer 50B is also provided on a portion of at least one of the first main surface TS1 or the second main surface TS2, the thickness of the second base electrode layer 50B provided in this portion in the lamination direction T is, for example, preferably between about 3 μm and about 40 μm inclusive at the center of the second base electrode layer 50B provided in this portion in the length direction L and the width direction W.

In cases where the second base electrode layer 50B is also provided on a portion of at least one of the first lateral surface WS1 or the second lateral surface WS2, the thickness of the second base electrode layer 50B provided in this portion in the width direction W is, for example, preferably between about 3 μm and about 40 μm inclusive at the center of the second base electrode layer 50B provided in this portion in the length direction L and the lamination direction T.

The first plated layer 60A covers the first base electrode layer 50A.

The second plated layer 60B covers the second base electrode layer 50B.

The first plated layer 60A and the second plated layer 60B may include, for example, at least one of Cu, Ni, Sn, Ag, Pd, Ag—Pd alloy, or Au. The first plated layer 60A and the second plated layer 60B may include a plurality of layers. The first plated layer 60A and the second plated layer 60B preferably have a two-portion structure in which a Sn plated layer is provided on top of a Ni plated layer.

The first plated layer 60A covers the first base electrode layer 50A. In the present example embodiment, the first plated layer 60A includes, for example, a first Ni plated layer 61A and a first Sn plated layer 62A provided on the first Ni plated layer 61A.

The second plated layer 60B covers the second base electrode layer 50B. In the present example embodiment, the second plated layer 60B includes, for example, a second Ni plated layer 61B and a second Sn plated layer 62B provided on the second Ni plated layer 61B.

The Ni plated layer prevents the first base electrode layer 50A and the second base electrode layer 50B from being eroded by solder when mounting the multilayer ceramic capacitor 1. The Sn plated layer improves the wettability of solder when mounting the multilayer ceramic capacitor 1. As a result, the multilayer ceramic capacitor 1 can be easily mounted. The thickness of the first Ni plated layer 61A, the first Sn plated layer 62A, the second Ni plated layer 61B, and the second Sn plated layer 62B is, for example, preferably between about 1 μm and about 15 μm inclusive.

The basic configuration of the multilayer ceramic capacitor 1 according to the present example embodiment has been described above. The dimension of the multilayer ceramic capacitor 1 including the multilayer body 10 and the external electrodes 40 in the length direction, denoted as the L dimension, is, for example, preferably between about 0.2 mm and about 10 mm inclusive. The dimension of the multilayer ceramic capacitor 1 in the lamination direction, denoted as the T dimension, is, for example, preferably between about 0.05 mm and about 10 mm inclusive. The dimension of the multilayer ceramic capacitor 1 in the width direction, denoted as the W dimension, is, for example, preferably between about 0.1 mm and about 10 mm inclusive.

The multilayer ceramic capacitor 1 of the present example embodiment including the basic configuration has the following characteristics in the external electrodes 40, which is the first external electrode 40A and the second external electrode 40B.

The external electrodes 40 of the present example embodiment include the main surface-side external electrodes provided on at least one of the first main surface TS1 or the second main surface TS2. Specifically, as described above, the first external electrode 40A of the present example embodiment is provided on the first end surface LS1 and extends from the first end surface LS1 to a portion of the first main surface TS1, a portion of the second main surface TS2, a portion of the first lateral surface WS1, and a portion of the second lateral surface WS2. The first external electrode 40A of the present example embodiment includes a first end surface-side external electrode 400A as an end surface-side external electrode provided on the first end surface LS1, a first main surface-side external electrode 411A as a main surface-side external electrode provided on the first main surface TS1, a second main surface-side external electrode 412A as a main surface-side external electrode provided on the second main surface TS2, as illustrated in FIG. 2, a first lateral surface-side external electrode 421A provided on the first lateral surface WS1, and a second lateral surface-side external electrode 422A provided on the second lateral surface WS2, as illustrated in FIGS. 4A and 4B.

As described above, the first external electrode 40A includes the first base electrode layer 50A and the first plated layer 60A provided on the first base electrode layer 50A. In the present example embodiment, the first base electrode layer 50A extends from the first end surface LS1 to a portion of the first main surface TS1, a portion of the second main surface TS2, a portion of the first lateral surface WS1, and a portion of the second lateral surface WS2, in which the first plated layer 60A is provided to cover the first base electrode layer 50A.

Specifically, as illustrated in FIG. 2, the first end surface-side external electrode 400A of the present example embodiment includes a first end surface-side base electrode layer 500A provided on the first end surface LS1, and a first end surface-side plated layer 600A provided above the first end surface-side base electrode layer 500A. The first end surface-side base electrode layer 500A is a portion of the first base electrode layer 50A. The first end surface-side plated layer 600A is a portion of the first plated layer 60A, and includes the first Ni plated layer 61A and the first Sn plated layer 62A provided on the first Ni plated layer 61A.

As illustrated in FIG. 2, the first main surface-side external electrode 411A of the present example embodiment includes a first main surface-side base electrode layer 511A as a main surface-side base electrode layer provided on the first main surface TS1, and a first main surface-side plated layer 611A as a main surface-side plated layer provided above the first main surface-side base electrode layer 511A. The first main surface-side base electrode layer 511A is a portion of the first base electrode layer 50A. The first main surface-side plated layer 611A is a portion of the first plated layer 60A, and includes the first Ni plated layer 61A and the first Sn plated layer 62A provided on the first Ni plated layer 61A.

As illustrated in FIG. 2, the second main surface-side external electrode 412A of the present example embodiment includes a second main surface-side base electrode layer 512A as a main surface-side base electrode layer provided on the second main surface TS2, and a second main surface-side plated layer 612A as a main surface-side plated layer provided above the second main surface-side base electrode layer 512A. The second main surface-side base electrode layer 512A is a portion of the first base electrode layer 50A. The second main surface-side plated layer 612A is a portion of the first plated layer 60A, and includes the first Ni plated layer 61A and the first Sn plated layer 62A provided on the first Ni plated layer 61A.

As illustrated in FIGS. 4A and 4B, the first lateral surface-side external electrode 421A of the present example embodiment includes a first lateral surface-side base electrode layer 521A provided on the first lateral surface WS1, and a first lateral surface-side plated layer 621A provided above the first lateral surface-side base electrode layer 521A. The first lateral surface-side base electrode layer 521A is a portion of the first base electrode layer 50A. The first lateral surface-side plated layer 621A is a portion of the first plated layer 60A, and includes the first Ni plated layer 61A and the first Sn plated layer 62A provided on the first Ni plated layer 61A.

As illustrated in FIGS. 4A and 4B, the second lateral surface-side external electrode 422A of the present example embodiment includes a second lateral surface-side base electrode layer 522A provided on the second lateral surface WS2, and a second lateral surface-side plated layer 622A provided above the second lateral surface-side base electrode layer 522A. The second lateral surface-side base electrode layer 522A is a portion of the first base electrode layer 50A. The second lateral surface-side plated layer 622A is a portion of the first plated layer 60A, and includes the first Ni plated layer 61A and the first Sn plated layer 62A provided on the first Ni plated layer 61A.

The thickness of the first Ni plated layer 61A and the first Sn plated layer 62A of the first main surface-side plated layer 611A, the second main surface-side plated layer 612A, the first lateral surface-side plated layer 621A, and the second lateral surface-side plated layer 622A is preferably, for example, between about 1 μm and about 4 μm inclusive.

As described above, the second external electrode 40B of the present example embodiment is provided on the second end surface LS2 and extends from the second end surface LS2 to a portion of the first main surface TS1, a portion of the second main surface TS2, a portion of the first lateral surface WS1, and a portion of the second lateral surface WS2. Specifically, the second external electrode 40B of the present example embodiment includes a second end surface-side external electrode 400B as an end surface-side external electrode provided on the second end surface LS1, a first main surface-side external electrode 411B provided as a main surface-side external electrode on the first main surface TS1, a second main surface-side external electrode 412B as a main surface-side external electrode provided on the second main surface TS2, as illustrated in FIG. 2, a first lateral surface-side external electrode 421B provided on the first lateral surface WS1, and a second lateral surface-side external electrode 422B provided on the second lateral surface WS2, as illustrated in FIGS. 4A and 4B.

As described above, the second external electrode 40B includes the second base electrode layer 50B and the second plated layer 60B provided on the second base electrode layer 50B. In the present example embodiment, the second base electrode layer 50B extends from the second end surface LS2 to a portion of the first main surface TS1, a portion of the second main surface TS2, a portion of the first lateral surface WS1, and a portion of the second lateral surface WS2, in which the second plated layer 60B is provided to cover the second base electrode layer 50B.

Specifically, as illustrated in FIG. 2, the second end surface-side external electrode 400B of the present example embodiment includes a second end surface-side base electrode layer 500B provided on the second end surface LS2, and a second end surface-side plated layer 600B provided above the second end surface-side base electrode layer 500B. The second end surface-side base electrode layer 500B is a portion of the second base electrode layer 50B. The second end surface-side plated layer 600B is a portion of the second plated layer 60B, and includes the second Ni plated layer 61B and the second Sn plated layer 62B provided on the second Ni plated layer 61B.

As illustrated in FIG. 2, the first main surface-side external electrode 411B of the present example embodiment includes the first main surface-side base electrode layer 511B as a main surface-side base electrode layer provided on the first main surface TS1, and the first main surface-side plated layer 611B as a main surface-side plated layer provided above the first main surface-side base electrode layer 511B. The first main surface-side base electrode layer 511B is a portion of the second base electrode layer 50B. The first main surface-side plated layer 611B is a portion of the second plated layer 60B, and includes the second Ni plated layer 61B and the second Sn plated layer 62B provided on the second Ni plated layer 61B.

As illustrated in FIG. 2, the second main surface-side external electrode 412B of the present example embodiment includes the second main surface-side base electrode layer 512B as a main surface-side base electrode layer provided on the second main surface TS2, and the second main surface-side plated layer 612B as a main surface-side plated layer provided above the second main surface-side base electrode layer 512B. The second main surface-side base electrode layer 512B is a portion of the second base electrode layer 50B. The second main surface-side plated layer 612B is a portion of the second plated layer 60B, and includes the second Ni plated layer 61B and the second Sn plated layer 62B provided on the second Ni plated layer 61B.

As illustrated in FIGS. 4A and 4B, the first lateral surface-side external electrode 421B of the present example embodiment includes the first lateral surface-side base electrode layer 521B provided on the first lateral surface WS1 and the first lateral surface-side plated layer 621B provided above the first lateral surface-side base electrode layer 521B. The first lateral surface-side base electrode layer 621B is a portion of the second base electrode layer 50B. The first lateral surface-side plated layer 621B is a portion of the second plated layer 60B, and includes the second Ni plated layer 61B and the second Sn plated layer 62B provided on the second Ni plated layer 61B.

As illustrated in FIGS. 4A and 4B, the second lateral surface-side external electrode 422B of the present example embodiment includes the second lateral surface-side base electrode layer 522B provided on the second lateral surface WS2 and the second lateral surface-side plated layer 622B provided above the second lateral surface-side base electrode layer 522B. The second lateral surface-side base electrode layer 522B is a portion of the second base electrode layer 50B. The second lateral surface-side plated layer 622B is a portion of the second plated layer 60B, and includes the second Ni plated layer 61B and the second Sn plated layer 62B provided on the second Ni plated layer 61B.

The thickness of the second Ni plated layer 61B and the second Sn plated layer 62B of the first main surface-side plated layer 611B, the second main surface-side plated layer 612B, the first lateral surface-side plated layer 621B, and the second lateral surface-side plated layer 622B is preferably, for example, between about 1 μm and about 4 μm inclusive.

FIG. 2 illustrates the LT cross-sectional view of the multilayer ceramic capacitor 1 and the multilayer body 10 along the lamination direction T and the length direction L. In the LT cross-sectional view, the first main surface-side external electrode 411A of the first external electrode 40A includes a first main surface-side recess 510A as a recess recessed towards the multilayer body 10 side. The first main surface-side recess 510A is provided on the surface of the first main surface-side external electrode 411A. The shape of the first main surface-side recess 510A is a groove extending in the width direction W orthogonal or substantially orthogonal to the LT cross-section, i.e., in the direction perpendicular or substantially perpendicular to the paper surface of FIG. 2. The first main surface-side recess 510A may be provided over the entire or substantially the entire length of the first main surface-side external electrode 411A along the width direction W. The first main surface-side recess 510A is provided near the approximate center of the first main surface-side external electrode 411A in the length direction L.

As illustrated in FIG. 2, the second main surface-side external electrode 412A of first external electrode 40A includes a second main surface-side recess 520A as a recess recessed towards the multilayer body 10 side in the LT cross-sectional view. The second main surface-side recess 520A is provided on the surface of the second main surface-side external electrode 412A. The shape of the second main surface-side recess 520A is a groove extending in the width direction W orthogonal or substantially orthogonal to the LT cross-section, i.e., in the direction perpendicular or substantially perpendicular to the paper surface of FIG. 2. The second main surface-side recess 520A may be provided over the entire or substantially the entire length of the second main surface-side external electrode 412A along the width direction W. The second main surface-side recess 520A is provided near the approximate center of the second main surface-side external electrode 412A in the length direction L.

As illustrated in FIG. 2, the first main surface-side external electrode 411B of the second external electrode 40B includes a first main surface-side recess 510B as a recess recessed towards the multilayer body 10 side in the LT cross-sectional view. The first main surface-side recess 510B is provided on the surface of the first main surface-side external electrode 411B. The shape of the first main surface-side recess 510B is a groove extending in the width direction W orthogonal or substantially orthogonal to the LT cross-section, i.e., in the direction perpendicular or substantially perpendicular to the paper surface of FIG. 2. The first main surface-side recess 510B may be provided over the entire or substantially the entire length of the first main surface-side external electrode 411B along the width direction W. The first main surface-side recess 510B is provided near the approximate center of the first main surface-side external electrode 411B in the length direction L.

As illustrated in FIG. 2, the second main surface-side external electrode 412B of the second external electrode 40B includes a second main surface-side recess 520B as a recess recessed towards the multilayer body 10 side in the LT cross-sectional view. The second main surface-side recess 520B is provided on the surface of the second main surface-side external electrode 412B. The shape of the second main surface-side recess 520B is a groove extending in the width direction W orthogonal or substantially orthogonal to the LT cross-section, i.e., in the direction perpendicular or substantially perpendicular to the paper surface of FIG. 2. The second main surface-side recess 520B may be provided over the entire length of the second main surface-side external electrode 412B along the width direction W. The second main surface-side recess 520B is provided near the approximate center of the second main surface-side external electrode 412B in the length direction L.

FIGS. 4A and 4B illustrate LW cross-sectional views of the multilayer ceramic capacitor 1 and the multilayer body 10 along the length direction L and the width direction W. In the LW cross-sectional views, the first lateral surface-side external electrode 421A of the first external electrode 40A includes a first lateral surface-side recess 530A as a recess recessed towards the multilayer body 10 side. The first lateral surface-side recess 530A is provided on the surface of the first lateral surface-side external electrode 421A. The shape of the first lateral surface-side recess 530A is a groove extending in the lamination direction T orthogonal or substantially orthogonal to the LW cross-section, i.e., in the direction perpendicular or substantially perpendicular to the paper surface of FIGS. 4A and 4B. The first lateral surface-side recess 530A may be provided over the entire or substantially the entire length of the first lateral surface-side external electrode 421A along the lamination direction T.

The first lateral surface-side recess 530A is provided near the approximate center of the first lateral surface-side external electrode 421A in the length direction L. The first lateral surface-side recess 530A may communicate with either or both of the first main surface-side recess 510A and the second main surface-side recess 520A, or may not communicate with both. As illustrated in FIGS. 4A and 4B, the second lateral surface-side external electrode 422A of the first external electrode 40A includes a second lateral surface-side recess 540A as a recess recessed towards the multilayer body 10 side in the LW cross-sectional view. The second lateral surface-side recess 540A is provided on the surface of the second lateral surface-side external electrode 422A. The shape of the second lateral surface-side recess 540A is a groove extending in the lamination direction T orthogonal or substantially orthogonal to the LW cross-section, i.e., in perpendicular the direction or substantially perpendicular to the paper surface of FIGS. 4A and 4B. The second lateral surface-side recess 540A may be provided over the entire or substantially the entire length of the second lateral surface-side external electrode 422A along the lamination direction T. The second lateral surface-side recess 540A is provided near the approximate center of the second lateral surface-side external electrode 422A in the length direction L. The second lateral surface-side recess 540A may communicate with either or both of the first main surface-side recess 510A and the second main surface-side recess 520A, or may not communicate with both.

As illustrated in FIGS. 4A and 4B, the first lateral surface-side external electrode 421B of the second external electrode 40B includes a first lateral surface-side recess 530B as a recess recessed towards the multilayer body 10 side in the LW cross-sectional view. The first lateral surface-side recess 530B is provided on the surface of the first lateral surface-side external electrode 421B. The shape of the first lateral surface-side recess 530B is a groove extending in the lamination direction T orthogonal or substantially orthogonal to the LW cross-section, i.e., in the direction perpendicular or substantially perpendicular to the paper surface of FIGS. 4A and 4B. The first lateral surface-side recess 530B may be provided over the entire or substantially the entire length of the first lateral surface-side external electrode 421B along the lamination direction T. The first lateral surface-side recess 530B is provided near the approximate center of the first lateral surface-side external electrode 421B in the length direction L. The first lateral surface-side recess 530B may communicate with either or both of the first main surface-side recess 510B and the second main surface-side recess 520B, or may not communicate with both.

As illustrated in FIGS. 4A and 4B, the second lateral surface-side external electrode 422B of the second external electrode 40B includes a second lateral surface-side recess 540B as a recess recessed towards the multilayer body 10 side in the LW cross-sectional view. The second lateral surface-side recess 540B is provided on the surface of the second lateral surface-side external electrode 422B. The shape of the second lateral surface-side recess 540B is a groove extending in the lamination direction T orthogonal or substantially orthogonal to the LW cross-section, i.e., in the direction perpendicular or substantially perpendicular to the paper surface of FIGS. 4A and 4B. The second lateral surface-side recess 540B may be provided over the entire or substantially the entire length of the second lateral surface-side external electrode 422B along the lamination direction T. The second lateral surface-side recess 540B is provided near the approximate center of the second lateral surface-side external electrode 422B in the length direction L. The second lateral surface-side recess 540B may communicate with either or both of the first main surface-side recess 510B and the second main surface-side recess 520B, or may not communicate with both.

The first main surface-side external electrode 411A and the second main surface-side external electrode 412A of the first external electrode 40A, as well as the first main surface-side external electrode 411B and the second main surface-side external electrode 412B of the second external electrode 40B, share the same or substantially the same configuration.

Similarly, the first lateral surface-side external electrode 421A and the second lateral surface-side external electrode 422A of the first external electrode 40A, as well as the first lateral surface-side external electrode 421B and the second lateral surface-side external electrode 422B of the second external electrode 40B, also share the same or substantially the same configuration as the four main surface-side external electrodes 411A, 412A, 411B, and 412B.

The first main surface-side recess 510A and the second main surface-side recess 520A of the first external electrode 40A, as well as the first main surface-side recesses 510B and the second main surface-side recesses 520B of the second external electrode 40B, share the same or substantially the same configuration. Similarly, the first lateral surface-side recess 530A and the second lateral surface-side recess 540A of the first external electrode 40A, as well as the first lateral surface-side recess 530B and the second lateral surface-side recess 540B of the second external electrode 40B, also share the same or substantially the same configuration as the four main surface-side recesses 510A, 520A, 510B, and 520B.

Accordingly, the first main surface-side external electrode 411A and the first main surface-side recess 510A of the first external electrode 40A will be described below, representatively describing the four main surface-side external electrodes, the four main surface-side recesses, the four lateral surface-side external electrodes, and the four lateral surface-side recesses.

The first main surface-side external electrode 411A of the first external electrode 40A corresponds to the second main surface-side external electrode 412A, the first lateral surface-side external electrode 421A, and the second lateral surface-side external electrode 422A of the first external electrode 40A, as well as the first main surface-side external electrode 411B, the second main surface-side external electrode 412B, the first lateral surface-side external electrode 421B, and the second lateral surface-side external electrode 422B of the second external electrode 40B. The first main surface-side recess 510A of the first external electrode 40A corresponds to the second main surface-side recess 520A, the first lateral surface-side recess 530A, and the second lateral surface-side recess 540A of the first external electrode 40A, as well as the first main surface-side recesses 510B, the second main surface-side recesses 520B, the first lateral surface-side recess 530B, and the second lateral surface-side recess 540B of the second external electrode 40B.

The first base electrode layer 50A and the first plated layer 60A of the first external electrode 40A correspond to the second base electrode layer 50B and the second plated layer 60B of the second external electrode 40B. The first Ni plated layer 61A and the first Sn plated layer 62A of the first plated layer 60A of the first external electrode 40A correspond to the second Ni plated layer 61B and the second Sn plated layer 62B of the second plated layer 60B of the second external electrode 40B.

Figure 5A:
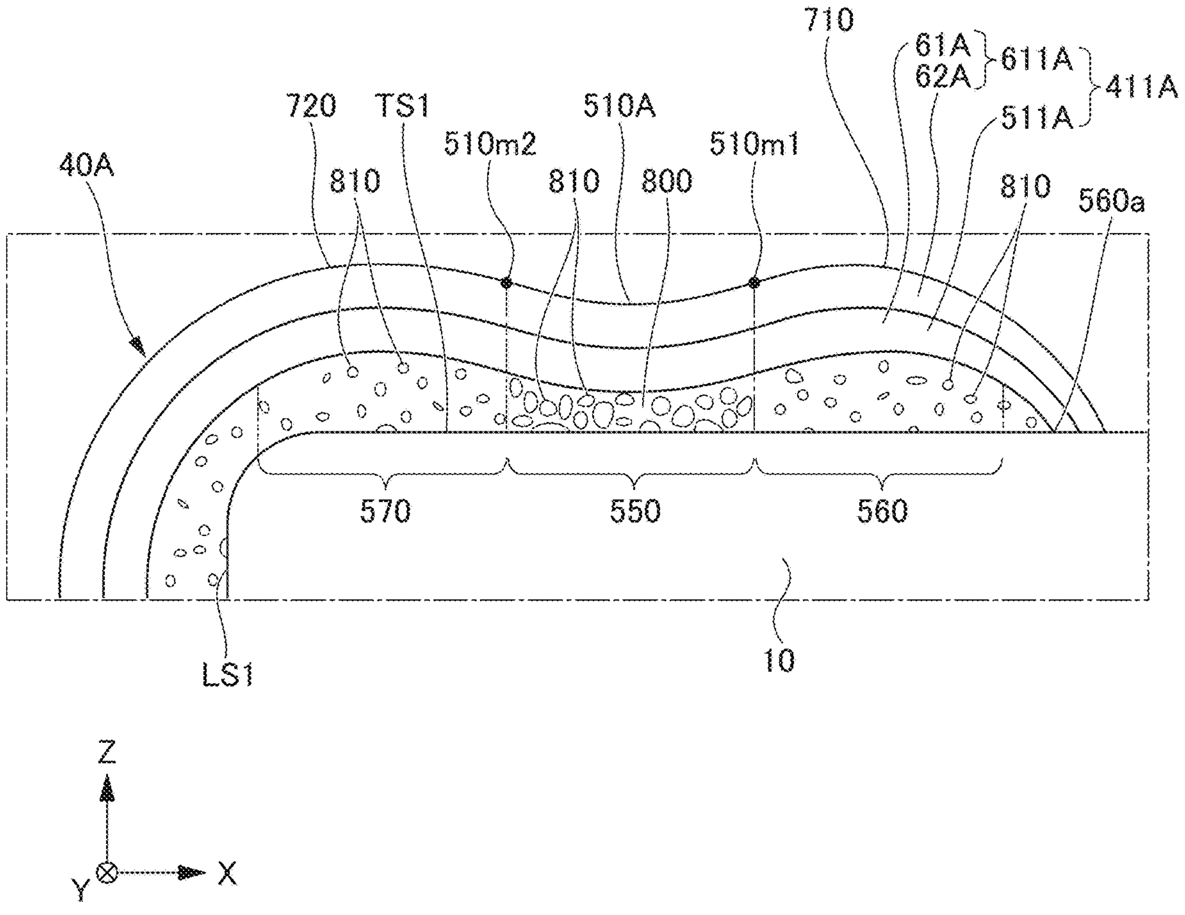
FIG. 5A is an enlarged view of the portion indicated by VA in FIG. 2, illustrating a cross section of a first main surface-side external electrode.
Figure 5B:
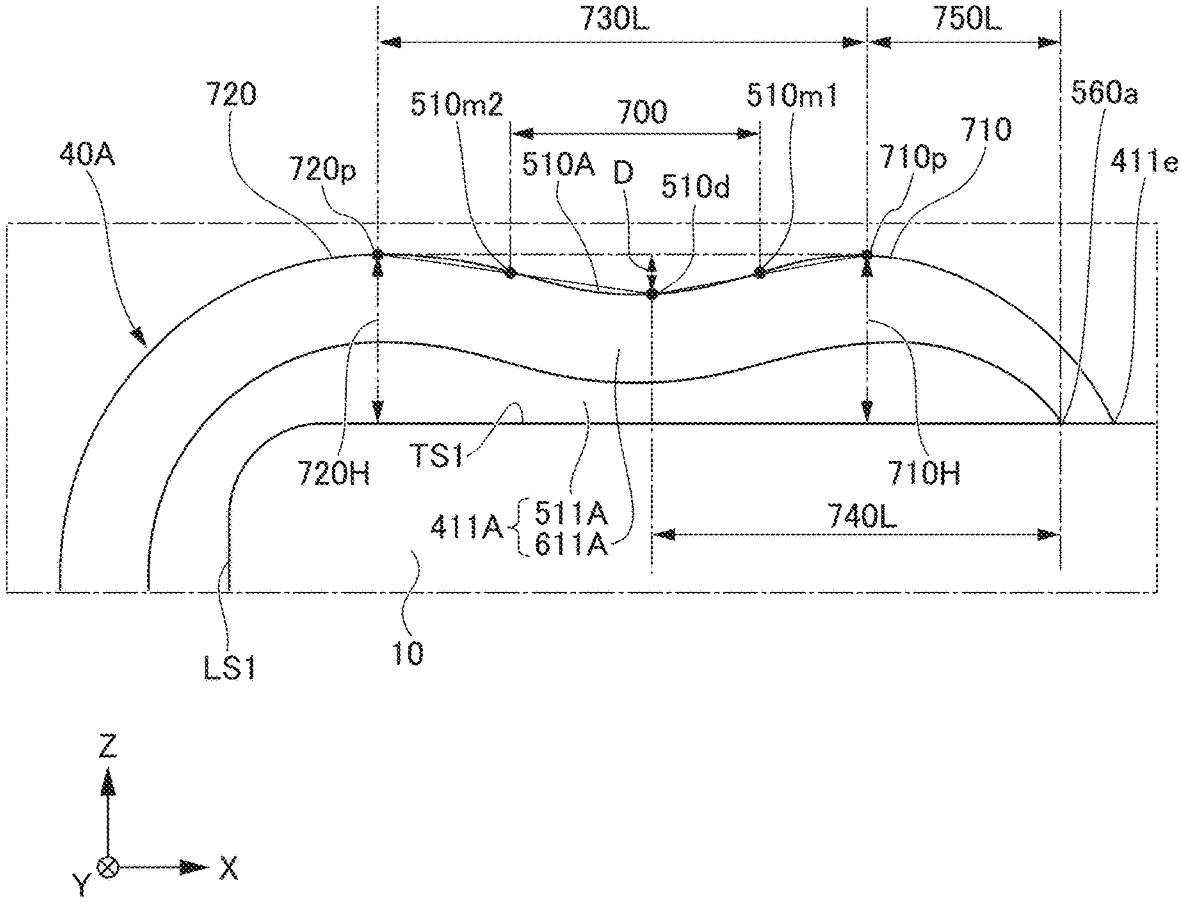
FIG. 5B is a view corresponding to FIG. 5A, illustrating a cross section of the first main surface-side external electrode.

FIG. 5A is an enlarged view of a portion indicated by VA in FIG. 2, illustrating an LT cross-sectional view of the first main surface-side external electrode 411A of the first external electrode 40A. FIG. 5B corresponds to FIG. 5A and illustrates the outer shape of the LT cross-sectional view of the first main surface-side external electrode 411A of the first external electrode 40A. FIGS. 5A and 5B illustrate the same XYZ orthogonal coordinate system as illustrated in FIGS. 1 to 4B.

As illustrated in FIG. 5A, the first main surface-side external electrode 411A of the first external electrode 40A includes the first main surface-side base electrode layer 511A provided on the first main surface TS1, and the first main surface-side plated layer 611A including the first Ni plated layer 61A and the first Sn plated layer 62A. The three layers, which include the first Sn plated layer 62A of the outermost first main surface-side plated layer 611A, the first Ni plated layer 61A as a lower layer below the first Sn plated layer 62A, and the first main surface-side base electrode layer 511A as a lower layer below the first Ni plated layer 61A, are recessed towards the multilayer body 10 side in the lamination direction T (the Z direction in FIGS. 5A and 5B), thus providing the first main surface-side recess 510A.

Therefore, the thickness of the first main surface-side base electrode layer 511A in the lamination direction T is minimized in the portion corresponding to the first main surface-side recess 510A. In the present example embodiment, the maximum thickness of the first main surface-side base electrode layer 511A is preferably, for example, between about 15 μm and about 30 μm inclusive.

The first main surface-side base electrode layer 511A of the first main surface-side external electrode 411A in the first external electrode 40A includes a recess-corresponding region 550 corresponding to the first main surface-side recess 510A, and an inner peripheral region 560 and an outer peripheral region 570 both adjacent to the recess-corresponding region 550 in the length direction L (the X direction in FIGS. 5A and 5B).

The recess-corresponding region 550 is a region corresponding to the first main surface-side recess 510A in the lamination direction T, within the first main surface-side base electrode layer 511A.

The inner peripheral region 560 within the first main surface-side base electrode layer 511A is a region to the inner side of the recess-corresponding region 550 in the length direction L, specifically a region to the central side of the multilayer body 10 in the length direction L (to the side distant from the first end surface LS1 in the length direction L), continuing from the recess-corresponding region 550 over a range substantially equivalent to the recess-corresponding region 550 in the length direction L.

The outer peripheral region 570 within the first main surface-side base electrode layer 511A is a region to the outer side of the recess-corresponding region 550 in the length direction L, specifically a region to the outer side of the multilayer body 10 in the length direction L (to the side closer to the first end surface LS1 in the length direction L), continuing from the recess-corresponding region 550 over a range substantially equivalent to the recess-corresponding region 550 in the length direction L.

As illustrated in FIG. 5B, the surface of the first main surface-side external electrode 411A includes the first main surface-side recess 510A, an inner bulge 710 on the inner side of the first main surface-side recess 510A, and a second bulge 720 on the outer side of the first main surface-side recess 510A.

The reference number 700 in FIG. 5B represents a region of the first main surface-side recess 510A (recess-corresponding region 550) in the length direction L, in the present example embodiment. The region 700 of the first main surface-side recess 510A in the length direction L is based on the distance in the length direction L between a first midpoint 510*m*1, which connects a deepest portion 510*d* of the first main surface-side recess 510A to a vertex 710*p* of the first bulge 710, and a second midpoint 510*m*2, which connects the deepest portion 510*d* of the first main surface-side recess 510A to a vertex 720*p* of the second bulge 720. The deepest portion 510*d* of the first main surface-side recess 510A refers to the portion closest to the first main surface TS1 of the multilayer body 10 in the lamination direction T, in the first main surface-side recess 510A. The vertex 710*p* of the first bulge 710 is the point farthest from the first main surface TS1 of the multilayer body 10 in the lamination direction T, on the surface of the first bulge 710. The vertex 720*p* of the second bulge 720 is the point farthest from the first main surface TS1 of the multilayer body 10 in the lamination direction T, on the surface of the second bulge 720.

The distance between the vertex 710*p* of the first bulge 710 and the first main surface TS1 of the multilayer body 10 in the lamination direction T is the height 710H of the first bulge 710. The distance between the vertex 720*p* of the second bulge 720 and the first main surface TS1 of the multilayer body 10 in the lamination direction T is the height 720H of the second bulge 720. In the present example embodiment, the height 710H of the first bulge 710 and the height 720H of the second bulge 720 may be the same or different. In the cases of being different, the height 710H of the first bulge 710 may be higher or lower than the height 720H of the second bulge 720.

As illustrated in FIG. 5B, in the present example embodiment, the depth D of the first main surface-side recess 510A refers to the shortest distance between the deepest portion 510*d* and the line connecting the vertex 710*p* of the first bulge 710 and the vertex 720*p* of the second bulge 720.

In the present example embodiment, the depth D of the first main surface-side recess 510A is, for example, preferably between about 3 μm and about 10 μm inclusive.

In the present example embodiment, the depth D of the first main surface-side recess 510A is preferably greater than the thickness of the Ni plated layer 61A in the lamination direction T.

As illustrated in FIG. 5B, in the present example embodiment, the distance 730L between the vertex 710*p* of the first bulge 710 and the vertex 720*p* of the second bulge 720 in the length direction L is, for example, preferably between about 50 μm and about 400 μm inclusive. The distance 730L is preferably greater than the maximum thickness of the first main surface-side base electrode layer 511A.

As illustrated in FIG. 5B, in the present example embodiment, the distance 740L between the inner end 560*a* of the first main surface-side base electrode layer 511A and the deepest portion 510*d* of the first main surface-side recess 510A in the length direction L is, for example, preferably between about 50 μm and about 400 μm inclusive.

As illustrated in FIG. 5B, in the present example embodiment, the distance 750L between the inner end 560*a* of the first main surface-side base electrode layer 511A and the vertex 710*p* of the first bulge 710 in the length direction L is, for example, preferably between about 50 μm and about 200 μm inclusive.

The inner peripheral region 560 corresponds to the first bulge 710 within the first main surface-side base electrode layer 511A. The outer peripheral region 570 corresponds to the second bulge 720 within the first main surface-side base electrode layer 511A.

As illustrated in FIG. 5A, the first main surface-side base electrode layer 511A includes a metal portion 800 and a plurality of non-metal portions 810 within the metal portion 800. The metal portion 800 includes, for example, at least one metal component selected from Cu, Ni, Ag, Pd, Ag—Pd alloy, Au, etc., included in the fired layer that defines the first main surface-side base electrode layer 511A. The plurality of non-metal portions 810 are dispersed in the metal portion 800.

The non-metal portions 810 are primarily voids, all of which may not be voids but include, for example, glass components including Ba or Si. The non-metal portions 810 relieve the stress caused by the force applied to the external electrode. Hereinafter, the non-metal portions 810 including glass components will be referred to as voids 810.

The first main surface-side base electrode layer 511A of the present example embodiment should satisfy the conditions that the metal density in the recess-corresponding region 550 is lower than the metal density in the inner peripheral region 560 corresponding to the first bulge 710, and lower than the metal density in the outer peripheral region 570 corresponding to the second bulge 720. Here, metal density refers to the proportion of the area occupied by the metal portion 800 within the first main surface-side base electrode layer 511A in the LT cross section.

The first main surface-side base electrode layer 511A of the present example embodiment, for example, preferably satisfies the conditions that the metal density in the recess-corresponding region 550 is at least about 10% lower than the metal density in the inner peripheral region 560 corresponding to the first bulge 710, and is at least about 10% lower than the metal density in the outer peripheral region 570 corresponding to the second bulge 720. In addition to satisfying the conditions, for example, the metal density in the recess-corresponding region 550 is, for example, preferably about 85% or lower, and more preferably between about 60% and about 85% inclusive.

In addition to satisfying the conditions, for example, the metal density in the inner peripheral region 560 corresponding to the first bulge 710, and the metal density in the outer peripheral region 570 corresponding to the second bulge 720 are preferably about 85% or more, and more preferably between about 90% and about 95% inclusive.

In the LT cross section of the first main surface-side base electrode layer 511A, the average area of the plurality of voids 810 in the recess-corresponding region 550 is preferably larger than the average area of the voids 810 in the inner peripheral region 560 and the voids 810 in the outer peripheral region 570.

In the present example embodiment of the multilayer ceramic capacitor 1, the first main surface-side external electrode 411A of the first external electrode 40A includes the first main surface-side recess 510A. In the first main surface-side external electrode 411A, the first main surface-side base electrode layer 511A directly in contact with the multilayer body 10 includes the recess-corresponding region 550 corresponding to the first main surface-side recess 510A, the inner peripheral region 560 as an area inside the recess-corresponding region 550 in the length direction L, and the outer peripheral region 570 as an area outside the recess-corresponding region 550 in the length direction L. The metal density in the recess-corresponding region 550 is lower than the metal density in the inner peripheral region 560 and the metal density in the outer peripheral region 570.

The metal density in the recess-corresponding region 550, which is at the center of the first main n surface-side base electrode layer 511A in the length direction L, is lower than the metal density in the inner peripheral region 560 and the metal density in the outer peripheral region 570 on both sides of the recess-corresponding region 550 in the length direction L. As a result, the recess-corresponding region 550 includes more non-metal portions 810. Therefore, the recess-corresponding region 550 relieves the stress caused by the force applied to the external electrode. The metal density in the recess-corresponding region 550, which is at the center of the first main surface-side base electrode layer 511A in the length direction L, is lower than the metal density in the inner peripheral region 560 and the metal density in the outer peripheral region 570 on both sides of the recess-corresponding region 550 in the length direction L. As a result, the adhesion to the multilayer body 10 in the recess-corresponding region 550 is likely to be lower than in the inner peripheral region 560 and the outer peripheral region 570. For example, in the case of mounting the external electrode of the multilayer ceramic capacitor 1 onto a board (attaching the first main surface-side external electrode 411A to the board by means such as soldering), the flexural stress occurring in the first main surface-side external electrode 411A particularly concentrates on the inner end portion 411*e* of the first main surface-side external electrode 411A illustrated in FIG. 5B, or on the inner end 560*a* of the first main surface-side base electrode layer 511A, and is transmitted as tensile stress to the multilayer body 10; as a result, cracks or the like may occur in the multilayer body 10. However, in the present example embodiment, the adhesion of the recess-corresponding region 550 of the first main surface-side base electrode layer 511A to the multilayer body 10 is relatively low. Therefore, the tensile stress caused by the flexural stress concentrating on the inner end portion 411*e* or the end 560*a* is also dispersed to the interface between the recess-corresponding region 550 and the multilayer body 10 having relatively low adhesion. As a result, the multilayer ceramic capacitor 1 of the present example embodiment can improve flexural resistance. As a result, the occurrence of cracks or the like in the multilayer body 10 is reduced or prevented.

In the multilayer ceramic capacitor 1 of the present example embodiment, since the first main surface-side external electrode 411A of the first external electrode 40A includes the first main surface-side recess 510A, a recess corresponding to the first main surface-side recess 510A is also provided in the first main surface-side base electrode layer 511A. Consequently, the total amount of the first main surface-side base electrode layer 511A can be reduced compared to the case of lacking the first main surface-side recess 510A. The reduction in the total amount leads to a decrease in the flexural stress caused by the tensile stress concentrated at the inner end portion 411*e* or the end 560*a*. This also enables improved flexural resistance, consequently reducing or preventing the occurrence of cracks or the like in the multilayer body 10.

Next, the following describes an example of a method of measuring various parameters such as the depth D of the first main surface-side recess 510A, the average area of the voids 810 in the first main surface-side base electrode layer 511A, and the metal density in the first main surface-side base electrode layer 511A, in the LT cross section of the multilayer ceramic capacitor 1. Hereinafter, the non-metal portions 810 including glass components will be referred to as the voids 810.

Firstly, the multilayer ceramic capacitor 1 is polished from either the first lateral surface WS1 or the second lateral surface WS2 to approximately half the width dimension W. As a result, the LT cross section is exposed in the middle of the multilayer ceramic capacitor 1 in the width direction W. Next, the depth D of the first main surface-side recess 510A in the LT cross section exposed by polishing is measured using a digital microscope. As a result, the depth D of the first main surface-side recess 510A is confirmed.

Next, the LT cross section exposed by polishing is observed using an SEM. Specifically, a portion including the first main surface-side base electrode layer 511A in the LT cross section is imaged as a reflected electron image. In the reflected electron image, differences in resistance are reflected as contrast, the metal portions 800 appear relatively white, and the voids 810 (non-metal portions 810) appear darker than the metal portions 800. The imaging magnification is set at 2000×, and portions of the recess-corresponding region 550, the inner peripheral region 560, and the outer peripheral region 570 within the first main surface-side base electrode layer 511A in the reflected electron image are set as the analysis target range.

The acquired reflected electron image is binarized using the image analysis software "WinROOF (manufactured by Mitani Corporation)" to identify the metal portions 800 and the plurality of voids 810 present within the metal portions 800. The binarized image is used to calculate the average area of the plurality of voids 810 and the metal density in the recess-corresponding region 550, the inner peripheral region 560, and the outer peripheral region 570 within the first main surface-side base electrode layer 511A, which are the analysis target range.

The area of the voids 810 is calculated based on the binarized image obtained by binarizing the reflected electron image. The average area of the plurality of voids 810 in the recess-corresponding region 550, the inner peripheral region 560, and the outer peripheral region 570 is calculated based on the areas of the voids 810 individually identified in these regions.

The area ratio of the voids 810 in the recess-corresponding region 550, the inner peripheral region 560, and the outer peripheral region 570 is calculated using the following equation (1), based on the area of these regions and the area of the voids 810 in these regions (analysis target range).

$$\text{Area Ratio of Voids (\%)} = (\text{Area of Voids}/\text{Area of Analysis Target Range}) \times 100 \quad (1)$$

The area ratio of the voids 810, namely the metal density, in the recess-corresponding region 550, the inner peripheral region 560, and the outer peripheral region 570, is calculated using the following equation (2), based on the void area ratio obtained.

$$100(\%) - \text{Area Ratio of Voids (\%)} = \text{Metal Density (\%)} \quad (2)$$

The area ratio of the metal portions 800, namely the metal density, in the recess-corresponding region 550, the inner peripheral region 560, and the outer peripheral region 570, can also be calculated using the following equation (3).

$$\text{Metal Density (\%)} = (\text{Area of Metal Portions}/\text{Area of Analysis Target Range}) \times 100 \quad (3)$$

Next, an example of a method of manufacturing the multilayer ceramic capacitor 1 according to the present example embodiment will be described. The method of manufacturing the multilayer ceramic capacitor 1 according to the present example embodiment is not limited, as long as the requirements described above are satisfied. However, a preferable manufacturing method includes the following steps. The details of each step are described below.

A dielectric sheet for the dielectric layer 20 and a conductive paste for the internal electrode layer 30 are prepared. Both of the dielectric sheet for the dielectric layer 20 and the conductive paste for the internal electrode layer 30 include binders and solvents. The binders and solvents may be any known ones. The conductive paste is, for example, obtained by adding organic binders and organic solvents to metal powders.

The conductive paste for the internal electrode layer 30 is printed in a predetermined pattern on the dielectric sheet, for example, by screen printing or gravure printing. As a result, a dielectric sheet with a pattern of the first internal electrode layer 31 and a dielectric sheet with a pattern of the second internal electrode layer 32 are prepared.

A predetermined number of dielectric sheets without a printed pattern of the internal electrode layer 30 are stacked, thus forming a portion that becomes the first main surface-side outer layer portion 12 on the first main surface TS1 side. On top of this, the dielectric sheet with the pattern of the first internal electrode layer 31 and the dielectric sheet with the pattern of the second internal electrode layer 32 are sequentially stacked alternately. As a result, a portion that becomes the inner layer portion 11 is formed. A predetermined number of dielectric sheets without the printed pattern of the internal electrode layer 30 are stacked on top of the portion that becomes the inner layer portion 11, thus forming a portion that becomes the second main surface-side outer layer portion 13 on the second main surface TS2 side. As a result, a multilayer sheet is produced.

The multilayer sheet is pressed in the lamination direction, for example, by hydrostatic pressure pressing, to produce a multilayer block.

The multilayer block is cut into individual pieces to obtain a plurality of multilayer chips. Subsequently, the multilayer chips may be polished, for example, by barrel polishing, to round the corners and edges.

The multilayer chips are fired to produce the multilayer body 10. The firing temperature in this case is, for example, preferably between about 900 °C and about 1400 °C inclusive, depending on the materials of the dielectric layer 20 and the internal electrode layer 30.

The first external electrode 40A and the second external electrode 40B are formed as follows on the end surfaces of the multilayer body 10.

A conductive paste, which becomes the first base electrode layer 50A, is applied to the first end surface LS1 side of the multilayer body 10. A conductive paste, which becomes the second base electrode layer 50B, is applied to the second end surface LS2 side of the multilayer body 10. In the present example embodiment, the first base electrode layer 50A and the second base electrode layer 50B are fired layers. The fired layers are formed by applying a conductive paste containing glass components and metal to the multilayer body 10, for example, by a method such as dipping, followed by firing. The firing temperature in this case is, for example, preferably between about 700 °C and about 950 °C inclusive.

The first base electrode layer 50A and the second base electrode layer 50B are preferably fired layers. This allows for relatively simply forming the first base electrode layer 50A and the second base electrode layer 50B, as compared to thin film formation methods such as sputtering or evaporation.

In the present example embodiment, a conductive paste, which becomes the first main surface-side base electrode layer 511A of the first base electrode layer 50A, is applied by, for example, dipping to extend from the first end surface LS1 of the multilayer body 10 to a portion of the first main surface TS1, and a conductive paste, which becomes the second main surface-side base electrode layer 512A of the first base electrode layer 50A, is applied by, for example, dipping to extend from the first end surface LS1 of the multilayer body 10 to a portion of the second main surface TS2.

Similarly, in the present example embodiment, a conductive paste, which becomes the first main surface-side base electrode layer 511B of the second base electrode layer 50B, is applied by, for example, dipping to extend from the second end surface LS2 of the multilayer body 10 to a portion of the first main surface TS1, and a conductive paste, which becomes the second main surface-side base electrode layer 512B of the second base electrode layer 50B, is applied by, for example, dipping to extend from the second end surface LS2 of the multilayer body 10 to a portion of the second main surface TS2.

In this case, a conductive paste, which becomes the first lateral surface-side base electrode layer 521A of the first base electrode layer 50A, is preferably applied by, for example, dipping to extend from the first end surface LS1 of the multilayer body 10 to a portion of the first lateral surface WS1, and a conductive paste, which becomes the second lateral surface-side base electrode layer 522A of the first base electrode layer 50A, is preferably applied by, for example, dipping to extend from the first end surface LS1 of the multilayer body 10 to a portion of the second lateral surface WS2.

Similarly, in this case, a conductive paste, which becomes the first lateral surface-side base electrode layer 521B of the second base electrode layer 50B, is preferably applied by, for example, dipping to extend from the second end surface LS2 of the multilayer body 10 to a portion of the first lateral surface WS1, and a conductive paste, which becomes the second lateral surface-side base electrode layer 522B of the second base electrode layer 50B, is preferably applied by, for example, dipping to extend from the second end surface LS2 of the multilayer body 10 to a portion of the second lateral surface WS2.

The pre-firing multilayer chips and the conductive paste applied to the multilayer chips may be simultaneously fired. In this case, the fired layers are preferably formed by firing a material containing a ceramic material instead of glass components. In this case, as the ceramic material to be added, a ceramic material of the same type as the dielectric layer 20 is particularly preferably used. In this case, a conductive paste is applied to the pre-firing multilayer chips, and the multilayer chips as well as the conductive paste applied to the multilayer chips are simultaneously fired, thus forming the multilayer body 10 with the fired layers. The multilayer body 10 is fired simultaneously with forming the fired layers, allowing for simplifying the manufacturing steps.

Subsequently, a plating treatment is performed on the surfaces of the first base electrode layer 50A and the second base electrode layer 50B including the fired layers. In the present example embodiment, the first plated layer 60A is formed on the surface of the first base electrode layer 50A. The second plated layer 60B is formed on the surface of the second base electrode layer 50B. In the present example embodiment, for example, the first Ni plated layer 61A is formed on the surface of the first base electrode layer 50A, and the first Sn plated layer 62A is formed on the surface of the first Ni plated layer 61A. In the present example embodiment, for example, the second Ni plated layer 61B is formed on the surface of the second base electrode layer 50B, and the second Sn plated layer 62B is formed on the surface of the second Ni plated layer 61B.

In performing the plating treatment, either electrolytic plating or electroless plating may be used. However, electroless plating requires pretreatment with catalysts to improve the plating deposition rate, involving a drawback to increase complexity of the steps. Therefore, electrolytic plating is preferred in most cases. The Ni plated layer and the Sn plated layer are preferably sequentially formed, for example, by barrel plating.

Here, for example, the following example methods may be used for obtaining the recess with a groove shape on the main surface-side external electrode and the lateral surface-side external electrode of the external electrode 40, as in the present example embodiment.

Figure 6A:
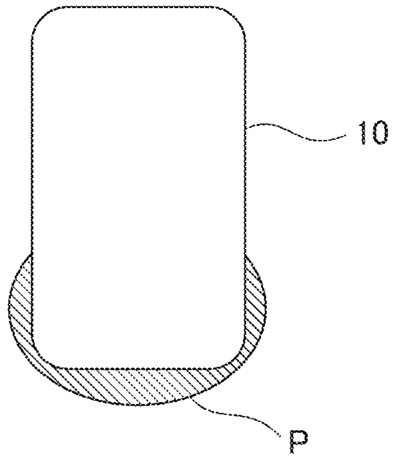
FIG. 6A is a diagram illustrating a method of manufacturing a multilayer ceramic capacitor according to an example embodiment of the present invention, illustrating a step of forming external electrodes on the multilayer body.
Figure 6B:
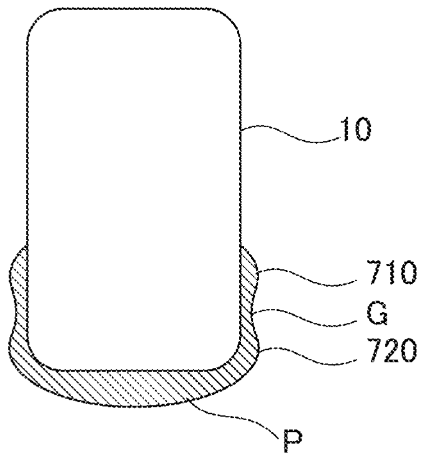
FIG. 6B is a diagram illustrating a method of manufacturing a multilayer ceramic capacitor according to an example embodiment of the present invention, illustrating a step of forming external electrodes on the multilayer body.

FIGS. 6A and 6B schematically illustrate the steps of forming the base electrode layer in this method. Firstly, as illustrated in FIG. 6A, a first conductive paste P, which becomes the base electrode layer, is applied by, for example, dipping to the end of the multilayer body 10 in the length direction L. The resulting product is then dried to volatilize the organic components. At this time, a difference in drying rate occurs between a portion in which the conductive paste P defining and functioning as a coating adheres in a thick manner and a portion in which the conductive paste P adheres in a thin manner. More specifically, the portion in which the conductive paste P adheres in a thin manner dries earlier. The capillary flow flowing from the portion in which the conductive paste P adheres in a thick manner to the portion in which the conductive paste P adheres in a thin manner caused by the difference in drying speed causes the solid components to migrate to the portion in which the conductive paste P adheres in a thin manner. More specifically, by adjusting the composition of the conductive paste P and the drying conditions, as shown in FIG. 6B, the solid components of the conductive paste P dry while migrating to the periphery of a portion corresponding to the end of the base electrode layer in which the coating is thin (the periphery of the end 560*a* in FIG. 5A) and toward the ridge line of the multilayer body 10. As a result, the recess G is formed and the bulges 710 and 720 are also formed, and the metal density of the recess-corresponding region becomes low. The recess G becomes the first main surface-side recess 510A, the second main surface-side recess 520A, the first lateral surface-side recess 530A, the second lateral surface-side recess 540A, the first main surface-side recess 510B, the second main surface-side recess 520B, the first lateral surface-side recess 530B, and the second lateral surface-side recess 540B.

The formation of the recess G and the metal density of the recess-corresponding region are controlled by adjusting the composition of the conductive paste P and the dry conditions.

The multilayer ceramic capacitor 1 is, for example, manufactured through the manufacturing steps described above.

The configurations of the multilayer ceramic capacitor 1 is not limited to those illustrated in FIGS. 1 to 4B. For example, the multilayer ceramic capacitor 1 may include a two-portion structure, a three-portion structure, or a four-portion structure as respectively illustrated in FIGS. 7A, 7B, and 7C.

Figure 7A:
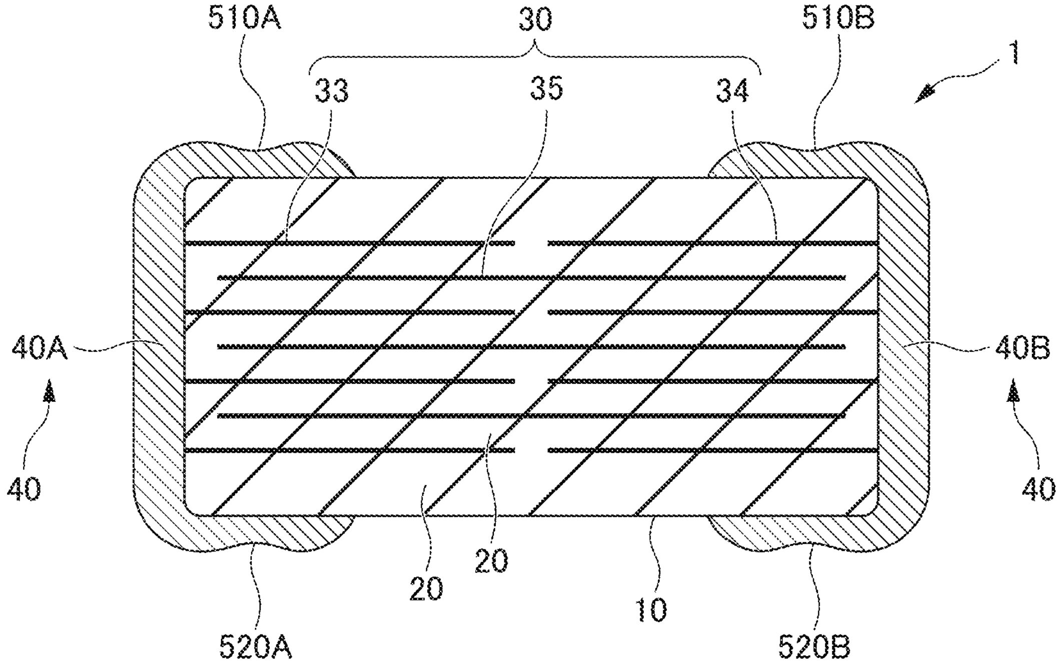
FIG. 7A illustrates a multilayer ceramic capacitor with a two-portion structure.

The multilayer ceramic capacitor 1 illustrated in FIG. 7A includes a two-portion structure, including a floating internal electrode layer 35 as a floating inner conductive layer that does not extend to either the first end surface LS1 or the second end surface LS2, in addition to the first internal electrode layer 33 and the second internal electrode layer 34 as the internal electrode layer 30.

Figure 7B:
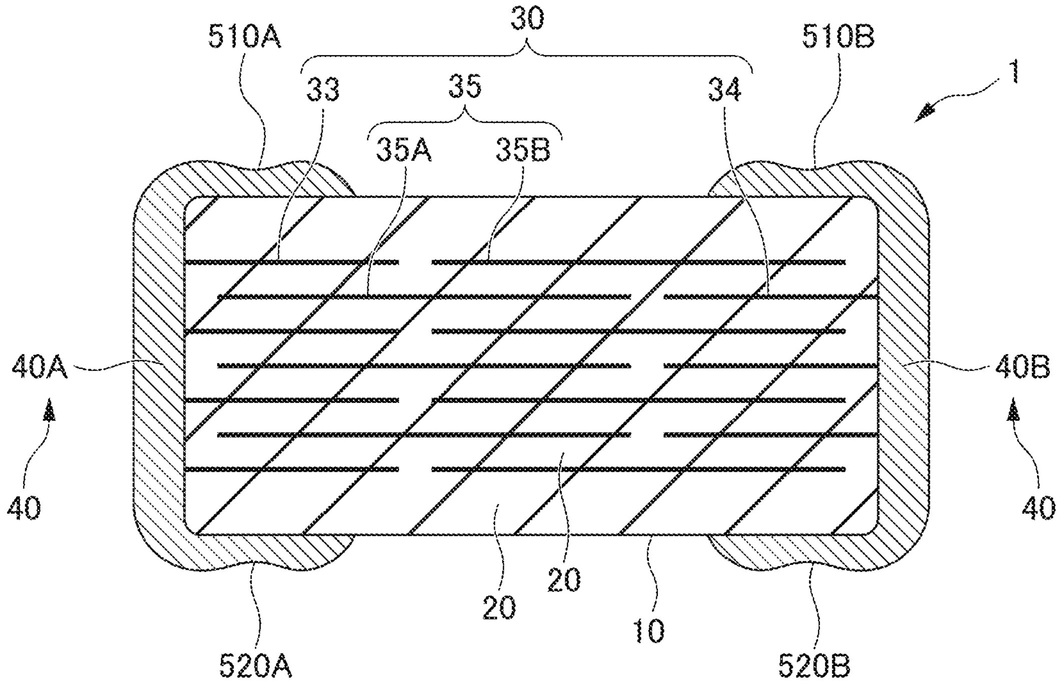
FIG. 7B illustrates a multilayer ceramic capacitor with a three-portion structure.

The multilayer ceramic capacitor 1 illustrated in FIG. 7B includes a three-portion structure, including a first floating internal electrode layer 35A and a second floating internal electrode layer 35B, as the floating internal electrode layer 35.

Figure 7C:
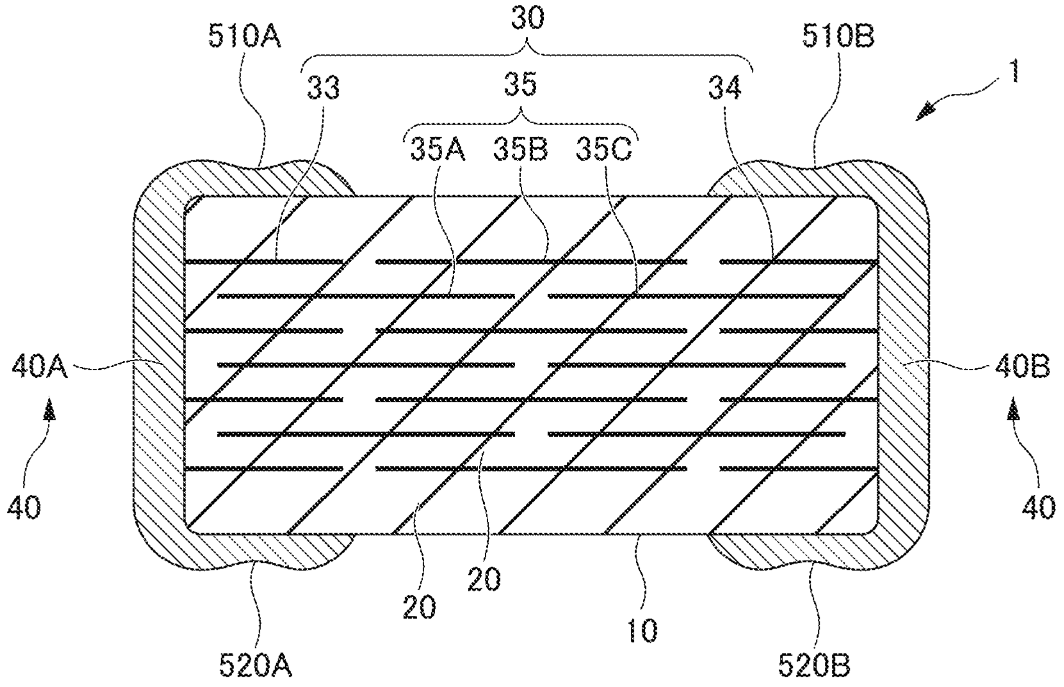
FIG. 7C illustrates a multilayer ceramic capacitor with a four-portion structure.

The multilayer ceramic capacitor 1 illustrated in FIG. 7C includes a four-portion structure, including the first floating internal electrode layer 35A, the second floating internal electrode layer 35B, and a third floating internal electrode layer 35C, as the floating internal electrode layer 35.

The multilayer ceramic capacitor 1 can be structured with a plurality of divided counter electrode portions by providing the floating internal electrode layers 35 as the internal electrode layer 30. As a result, a plurality of capacitor components are provided between the counter internal electrode layers 30, and the capacitor components are connected in series. Therefore, the voltage applied to each capacitor component is reduced, allowing for achieving high withstand voltage of the multilayer ceramic capacitor 1. The multilayer ceramic capacitor 1 in the present example embodiment may include a multi-portion structure of four or more portions.

In the multilayer ceramic capacitor 1 with the structures illustrated in FIGS. 7A, 7B, and 7C, similar to the example embodiment described above, the first external electrode 40A includes the first main surface-side recess 510A and the second main surface-side recess 520A, while the second external electrode 40B includes the first main surface-side recess 510B and the second main surface-side recess 520B.

In the multilayer ceramic capacitor 1 with the structures illustrated in FIGS. 7A, 7B, and 7C, similar to the example embodiments described above, the first external electrode 40A may include the first lateral surface-side recess 530A and the second lateral surface-side recess 540A, while the second external electrode 40B may include the first lateral surface-side recess 530B and the second lateral surface-side recess 540B.

In particular, even in the multilayer ceramic capacitor 1 including, for example, a two-portion structure, a third-portion structure, or a four-portion structure including the floating internal electrode layer 35 shown in FIGS. 7A to 7C, for example, as in the example embodiments described above, the recesses (first main surface-side recess, second main surface-side recess) are provided to the main surface-side external electrode, and the metal density in the recess-corresponding region 550 is made lower than the metal density in the peripheral regions (inner peripheral region 560, outer peripheral region 570), thereby allowing for improving the flexural resistance, and consequently reducing or preventing the occurrence of cracks or the like in the multilayer body 10.

The multilayer ceramic capacitor 1 according to the example embodiments described above achieve the following advantageous effects.

(1) A multilayer ceramic capacitor 1 according to an example embodiment includes the plurality of dielectric layers 20 as the plurality of ceramic layers, and the plurality of internal electrode layers 30 as the plurality of inner conductive layers, both of which are stacked alternately in the lamination direction T. The multilayer ceramic capacitor 1 also includes the multilayer body 10 and the pair of external electrodes 40. The multilayer body 10 includes the first main surface TS1 and the second main surface TS2 on opposite sides in the lamination direction T, the first end surface LS1 and the second end surface LS2 on opposite sides in the length direction L orthogonal or substantially orthogonal to the lamination direction T, and the first lateral surface WS1 and the second lateral surface WS2 on opposite sides in the width direction W orthogonal or substantially orthogonal to both the lamination direction T and the length direction L. The pair of external electrodes 40 are spaced apart from each other at both ends of the multilayer body 10 in the length direction L. The internal electrode layer 30 includes the first internal electrode layer 31 as the first inner conductive layer extending to the first end surface LS1, and the second internal electrode layer 32 as the second inner conductive layer extending to the second end surface LS2. The external electrodes 40 include the first main surface-side external electrodes 411A, the second main surface-side external 412A, the first main surface-side external electrode 411B, and the second main surface-side external electrode 412B, as the main surface-side external electrodes provided on the first main surface TS1 and the second main surface TS2, respectively. The first main surface-side external electrode 411A, the second main surface-side external electrode 412A, the first main surface-side external electrode 411B, and the second main surface-side external electrode 412B include the first main surface-side base electrode layer 511A, the second main surface-side base electrode layer 512A, the first main surface-side base electrode layer 511B, and the second main surface-side base electrode layer 512B, respectively, as the main surface-side external electrodes, and also include the first main surface-side plated layer 611A, the second main surface-side plated layer 612A, the first main surface-side plated layer 611B, and the second main surface-side plated layer 612B, respectively, as the main surface-side plated layers formed above the first main surface-side base electrode layer 511A, the second main surface-side base electrode layer 512A, the first main surface-side base electrode layer 511B, and the second main surface-side base electrode layer 512B. The first main surface-side external electrode 411A, the second main surface-side external electrode 412A, the first main surface-side external electrode 411B, and the second main surface-side external electrode 412B include the first main surface-side recess 510A, the second main surface-side recess 520A, the first main surface-side recess 510B, and the second main surface-side recess 520B, respectively, as the recesses recessed toward the multilayer body 10 side in the cross-sectional view along the lamination direction T and the length direction L. The first main surface-side base electrode layer 511A, the second main surface-side base electrode layer 512A, the first main surface-side base electrode layer 511B, and the second main surface-side base electrode layer 512B include the recess-corresponding regions 550 respectively corresponding to the first main surface-side recess 510A, the second main surface-side recess 520A, the first main surface-side recess 510B, and the second main surface-side recess 520B, and the inner peripheral region 560 and the outer peripheral region 570 as the peripheral regions adjacent to the recess-corresponding regions 550 in the length direction L. The metal density in the recess-corresponding region 550 is lower than the metal density in the inner peripheral region 560 and the outer peripheral region 570.

As a result, the multilayer ceramic capacitor 1 according to the above-described example embodiments can improve the flexural resistance when mounted on a board, consequently reducing or preventing the occurrence of cracks or the like in the multilayer body 10.

(2) In a multilayer ceramic capacitor 1 according to an example embodiment, the metal density in the recess-corresponding region 550 is preferably about 85% or less.

As a result, the flexural resistance can be improved when mounted on a board, consequently reducing or preventing the occurrence of cracks or the like in the multilayer body 10.

(3) In a multilayer ceramic capacitor 1 according to an example embodiment described above in (1), the metal density in the recess-corresponding region 550 is preferably between about 60% and about 85% inclusive.

As a result, the flexural resistance can be improved when mounted on a board, consequently reducing or preventing the occurrence of cracks or the like in the multilayer body 10.

(4) In a multilayer ceramic capacitor 1 according to an example embodiment, the internal electrode layer 30 includes the floating internal electrode layer 35 as the floating inner conductive layer, which does not extend to either the first end surface LS1 or the second end surface LS2, and which faces at least one of the first internal electrode layer 31 or the second internal electrode layer 32 across the dielectric layer 20.

This allows for achieving high withstand voltage of the multilayer ceramic capacitor 1.

In the multilayer ceramic capacitor 1 according to an example embodiment may include a feature, in which each of the first external electrode 40A and the second external electrode 40B includes the lateral surface-side external electrode, the lateral surface-side external electrode also includes a recess the same as or similar to that of the main surface-side external electrode, and the metal density in the recess-corresponding region of the base electrode layer of the lateral surface-side external electrode is lower than the metal density in the peripheral regions of the recess-corresponding region.

In other words, the multilayer ceramic capacitor 1 of the above-described example embodiment includes the multilayer body 10. The multilayer body 10 includes the plurality of dielectric layers 20 as the plurality of ceramic layers, and the plurality of internal electrode layers 30 as the plurality of inner conductive layers, both of which are stacked alternately in the lamination direction T. The multilayer body 10 also includes the first main surface TS1 and the second main surface TS2 on opposite sides in the lamination direction T, the first end surface LS1 and the second end surface LS2 on opposite sides in the length direction L orthogonal or substantially orthogonal to the lamination direction T, and the first lateral surface WS1 and the second lateral surface WS2 on opposite sides in the width direction W orthogonal or substantially orthogonal to both the lamination direction T and the length direction L. The multilayer body 10 also includes the pair of external electrodes 40 spaced apart from each other at both ends of the multilayer body 10 in the length direction L. The inner conductive layer includes the first internal electrode layer 31 as a first inner conductive layer extending to the first end surface LS1, and the second internal electrode layer 32 as a second inner conductive layer extending to the second end surface LS2. The external electrodes 40 include the lateral surface-side external electrode provided on at least one of the first lateral surface WS1 or the second lateral surface WS2. The lateral surface-side external electrode includes the lateral surface-side base electrode layer, and the e lateral surface-side plated layer formed above the lateral surface-side base electrode layer. The lateral surface-side external electrode includes the recess recessed towards the multilayer body 10 side in a cross-sectional view along the width direction W and the length direction L. The lateral surface-side base electrode layer includes the recess-corresponding region corresponding to the recess, and the peripheral regions adjacent to the recess-corresponding region in the length direction L. The metal density in the recess-corresponding region is lower than the metal density in the peripheral regions.

The present invention is not limited to the configurations of the example embodiments and can be appropriately modified and applied within the scope that does not change the scope of the present invention. Combinations of two or more of any individual example configurations described in the example embodiments are also included with the scope of the present invention.

For example, the multilayer ceramic capacitor 1 may be of a two-terminal multilayer ceramic capacitor including two external electrodes or a multi-terminal multilayer ceramic capacitor including a plurality of external electrodes. In the above-described example embodiments, the multilayer ceramic capacitors including dielectric ceramics has been described as an example of the multilayer ceramic electronic component. However, the multilayer ceramic electronic components disclosed herein are not limited to this, and various multilayer ceramic electronic components such as piezoelectric components using piezoelectric ceramics, thermistors using semiconductor ceramics, and inductors using magnetic ceramics can also be applied. Examples of piezoelectric ceramics may include PZT (lead zirconate titanate) ceramics, examples of semiconductor ceramics may include spinel ceramics, and examples of magnetic ceramics may include ferrites.

EXAMPLES

Examples will be described below. Pursuant to the examples of the manufacturing methods as described above in the example embodiments, multilayer ceramic capacitors were manufactured, by lot, as samples of Examples 1 and 2 as illustrated in Table 1, in which each of the first external electrode and the second external electrode includes the first main surface-side recess and the second main surface-side recess, and the metal density in the recess-corresponding region differs from the metal density in the inner peripheral region and the outer peripheral region. The samples in each lot were manufactured under the identical manufacturing conditions. For each of the Examples, samples for metal density measurement (n=20) and samples for board bending resistance test (n=30) were taken out from the same lot and prepared. In the metal density measurement, the average value of the measurement results was used and evaluated. The measurement of metal density was performed in accordance with the measurement method in the example embodiments.

In the manufacturing process, each multilayer ceramic capacitor was produced with the following specifications:

$$\text{Dimensions of the multilayer ceramic capacitor: } L\times W\times T = \text{about 1.6 mm}\times\text{about 0.8 mm}\times\text{about 0.8 mm}$$

Dielectric layer: $BaTiO_3$

Capacitance: about 10 μF

Rated voltage: about 25 V

Base electrode layer: Electrodes containing electrically conductive metal (Cu) and glass components (thickness of the base electrode layer provided on each of the first end surface and the second end surface: about 36 μm)

Plated layer: Bilayer formation of Ni plated layer (about 2 μm) and Sn plated layer (about 4 μm)

Internal electrode layer: Ni

On the other hand, multilayer ceramic capacitors in which none of the first external electrode and the second external electrode included the first main surface-side recess and the second main surface-side recess were manufactured as samples of respective Comparative Examples 1, 2, and 3 as illustrated in Table 1, and the same number of samples as those of the Examples were prepared.

A multilayer ceramic capacitor in which each of the first external electrode and the second external electrode includes the first main surface-side recess and the second main surface-side recess. However, a multilayer ceramic capacitor for which the metal density in the recess-corresponding region did not become lower than the metal density in the peripheral regions was manufactured as Comparative Example 4 as illustrated in Table 1, and the same number of samples as those in the Examples were prepared.

For the multilayer ceramic capacitors of Examples 1 and 2 as well as Comparative Examples 1 to 4, a board bending resistance test to reflect the flexural resistance was conducted, and the results were evaluated. The evaluation results are illustrated in Table 1. The outline of the board bending resistance test is as follows. A multilayer ceramic capacitor is mounted on a glass fiber base epoxy resin printed wiring board. A press rod is used to press against the back of the mounting surface, thereby performing a three-point bend to check whether cracks appear in the multilayer ceramic capacitor. At this time, a load is applied to the center of the specimen at a rate of about 1.0 mm/see and held for about 5+ (plus-minus) 1 seconds after reaching a predetermined amount of deflection. When following JIS C 60069 Feb. 21, the load is held for about 20+ (plus-minus) 1 seconds. Defect detection assumes that no cracks have occurred at the beginning. The capacitance change rate at that time that does not satisfy the individual specification is also considered a defective result. If cracks occur before reaching the is considered predetermined amount of deflection, the product defective at that point in time. Next, visual inspection and cross-sectional polishing are performed to confirm that no cracks or other defects have occurred. The evaluation rated as A for all chips that were good, B for those that had one or more and three or less defective chips, and C for those that had four or more defective chips.

TABLE 1

| | Comparative Example 1 | Comparative Example 2 | Comparative Example 3 | Example 1 | Example 2 | Example 3 |
|---|---|---|---|---|---|---|
| RECESS | ABSENT | ABSENT | ABSENT | PRESENT | PRESENT | PRESENT |
| METAL DENSITY OF SUBSTANTIALLY CENTER REGION OF MAIN SURFACE-SIDE EXTERNAL | 60% | 84% | 94% | 61% | 85% | 94% |

TABLE 1-continued

| | Comparative Example 1 | Comparative Example 2 | Comparative Example 3 | Example 1 | Example 2 | Example 3 |
|---|---|---|---|---|---|---|
| ELECTRODE (RECESS REGION) METAL DENSITY IN THE PERIPHERAL REGIONS | 94% | 92% | 92% | 95% | 92% | 91% |
| BOARD BENDING RESISTANCE | B | B | C | A | A | C |

In view of Table 1, in Comparative Examples 1 and 2, the metal density in the center region of the main surface-side external electrode in the length direction was lower than the metal density in the peripheral regions. However, the flexural resistance was not satisfactory due to the absence of the recesses in the main surface-side external electrodes. In Comparative Example 3, the metal density in the substantially middle region of the main surface-side external electrode in the length direction was not lower than the metal density in the peripheral regions, and furthermore, the main surface-side external electrode did not include the recesses. For these reasons, the flexural resistance was not satisfactory. In Comparative Example 4, the main surface-side external electrode included the recesses, but the metal density in the recess region (the substantially center region of the main surface-side external electrode in the length direction) was higher than the metal density in the peripheral regions. for these reasons, the flexural resistance was not satisfactory. On the contrary, in Examples 1 and 2, the main surface-side external electrode included the recesses, and the metal density in the recess region (the substantially center region of the main surface-side external electrode in the length direction) was lower than the metal density in the peripheral regions. For these reasons, the flexural resistance was satisfactory. This indicates that not only recesses but also a lower metal density in the recess-corresponding region than in the peripheral regions is effective in improving flexural resistance.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic electronic component, comprising:

a multilayer body including a plurality of ceramic layers and a plurality of inner conductive layers stacked alternately in a lamination direction, first and second main surfaces on opposite sides in the lamination direction, first and second end surfaces on opposite sides in a length direction orthogonal or substantially orthogonal to the lamination direction, and first and second lateral surfaces on opposite sides in a width direction orthogonal or substantially orthogonal to both the lamination direction and the length direction; and a pair of external electrodes spaced apart from each other at both ends of the multilayer body in the length direction;

wherein the inner conductive layers include a first inner conductive layer extending to the first end surface, and a second inner conductive layer extending to the second end surface;

the external electrodes include a main surface-side external electrode on at least one of the first main surface or the second main surface;

the main surface-side external electrode includes a main surface-side base electrode layer, and a main surface-side plated layer above the main surface-side base electrode layer;

the main surface-side external electrode includes a recess recessed towards the multilayer body side in a cross-sectional view along the lamination direction and the length direction;

the main surface-side base electrode layer includes a recess-corresponding region corresponding to the recess, and a peripheral region adjacent to the recess-corresponding region in the length direction; and a metal density in the recess-corresponding region is lower than a metal density in the peripheral region.

2. The multilayer ceramic electronic component according to claim 1, wherein the metal density in the recess-corresponding region is about 85% or less.

3. The multilayer ceramic electronic component according to claim 1, wherein the metal density in the recess-corresponding region is between about 60% and about 85% inclusive.

4. The multilayer ceramic electronic component according to claim 1, wherein the inner conductive layers include a floating inner conductive layer facing at least one of the first inner conductive layer or second inner conductive layer across the ceramic layers, the floating inner conductive layer not extending to either the first or second end surface.

5. The multilayer ceramic electronic component according to claim 1, wherein a dimension of the multilayer body in the length direction is between about 0.2 mm and about 10 mm inclusive;

a dimension of the multilayer body in the lamination direction is between about 0.05 mm and about 10 mm inclusive; and a dimension of the multilayer body in the width direction is between about 0.1 mm and about 10 mm inclusive.

6. The multilayer ceramic electronic component according to claim 1, wherein each of the plurality of ceramic layers includes $BaTiO_3$, $CaTiO_3$, $SrTiO_3$, or $CaZrO_3$ as a main component.

7. The multilayer ceramic electronic component according to claim 6, wherein each of the plurality of ceramic layers includes Mn compounds, Fe compounds, Cr compounds, Co compounds, or Ni compounds as an accessory component.

8. The multilayer ceramic electronic component according to claim 1, wherein a thickness of each of the plurality of ceramic layers is between about 0.2 μm and about 15 μm inclusive.

9. The multilayer ceramic electronic component according to claim 1, wherein a number of the plurality of ceramic layers is between 10 and 1200 inclusive.

10. The multilayer ceramic electronic component according to claim 1, wherein each of the inner conductive layers includes Ni, Cu, Ag, Pd, or Au, or alloys including at least one of Ni, Cu, Ag, Pd, or Au.

11. The multilayer ceramic electronic component according to claim 1, wherein a thickness of each of the plurality of inner conductive layers is between about 0.2 μm and about 2.0 μm inclusive.

12. The multilayer ceramic electronic component according to claim 1, wherein a number of the plurality of inner conductive layers is between 10 and 1000 inclusive.

13. The multilayer ceramic electronic component according to claim 1, wherein each of the pair of external electrodes includes a base electrode layer and a plated layer on the base electrode layer.

14. The multilayer ceramic electronic component according to claim 13, wherein the base electrode layer includes a metal component and at least one of a glass component or a ceramic component.

15. The multilayer ceramic electronic component according to claim 14, wherein the metal component includes at least one of Cu, Ni, Ag, Pd, Ag—Pd alloy, or Au.

16. The multilayer ceramic electronic component according to claim 14, wherein the ceramic component includes at least one of $BaTiO_3$, $CaTiO_3$, (Ba, Ca) $TiO_3$, $SrTiO_3$, or $CaZrO_3$.

17. The multilayer ceramic electronic component according to claim 13, wherein a thickness of the base electrode layer is between about 2 μm and about 220 μm inclusive.

18. The multilayer ceramic electronic component according to claim 13, wherein the plated layer includes at least one of Cu, Ni, Sn, Ag, Pd, Ag—Pd alloy, or Au.

* * * * *